United States Patent
Fitzpatrick

(10) Patent No.: US 9,623,593 B2
(45) Date of Patent: Apr. 18, 2017

(54) MOLDING MACHINE AND METHOD OF MOLDING A PART

(71) Applicant: EXTRUDE TO FILL, LLC, Loveland, CO (US)

(72) Inventor: Richard Ernest Fitzpatrick, Loveland, CO (US)

(73) Assignee: EXTRUDE TO FILL, LLC, Loveland, CO (US)

( * ) Notice: Subject to any disclaimer, the term of this patent is extended or adjusted under 35 U.S.C. 154(b) by 0 days.

(21) Appl. No.: 15/177,302

(22) Filed: Jun. 8, 2016

(65) Prior Publication Data

US 2016/0279841 A1    Sep. 29, 2016

Related U.S. Application Data

(63) Continuation-in-part of application No. 14/959,921, filed on Dec. 4, 2015, and a continuation-in-part of
(Continued)

(51) Int. Cl.
*B29C 45/47* (2006.01)
*B29C 45/13* (2006.01)
(Continued)

(52) U.S. Cl.
CPC .............. *B29C 45/13* (2013.01); *B29C 45/03* (2013.01); *B29C 45/18* (2013.01); *B29C 45/23* (2013.01);
(Continued)

(58) Field of Classification Search
CPC ..... B29C 45/10; B29C 45/13; B29C 45/5092; B29C 2945/76371; B29C 2945/76849
See application file for complete search history.

(56) References Cited

U.S. PATENT DOCUMENTS 2,734,226 A    2/1956    Willert
3,001,233 A    9/1961    Ernst
(Continued)

FOREIGN PATENT DOCUMENTS

DE    4239776    *    6/1994
EP    0057148    *    1/1982
(Continued)

OTHER PUBLICATIONS

"Sequential Valve Gate Control a New Opportunity for Productivity", Mar. 2, 2004, www.rjginc.com/paperclip/articles/sequetial_valve.pdf, 10 pages.*
(Continued)

*Primary Examiner* — Jill Heitbrink
(74) *Attorney, Agent, or Firm* — Dorsey & Whitney LLP

(57) ABSTRACT

The present disclosure provides a molding machine and a method of molding a part. The molding machine may include multiple molding systems (e.g., extruders) for pumping molten material into one or more mold cavities. The multiple molding systems may pump the same material or different materials into the one or more mold cavities. The multiple molding systems may be individually and/or collectively controlled. A method of molding a part may include pumping material into one or more mold cavities via multiple molding systems, ceasing pumping material into the one or more mold cavities when one or more pressures associated with the multiple molding systems are achieved, and releasing a molded part from the one or more mold cavities after the one or more pressures are achieved.

30 Claims, 15 Drawing Sheets

US 9,623,593 B2

Page 2

Related U.S. Application Data application No. PCT/US2015/064045, filed on Dec. 4, 2015, and a continuation-in-part of application No. 14/960,115, filed on Dec. 4, 2015, and a continuation-in-part of application No. PCT/US2015/064110, filed on Dec. 4, 2015, and a continuation-in-part of application No. 14/960,101, filed on Dec. 4, 2015, and a continuation-in-part of application No. PCT/US2015/064073, filed on Dec. 4, 2015.

(60) Provisional application No. 62/087,414, filed on Dec. 4, 2014, provisional application No. 62/087,449, filed on Dec. 4, 2014, provisional application No. 62/087,480, filed on Dec. 4, 2014.

(51) Int. Cl.

| | | |
|---|---|---|
| *B29C 45/03* | (2006.01) | |
| *B29C 45/18* | (2006.01) | |
| *B29C 45/23* | (2006.01) | |
| *B29C 45/40* | (2006.01) | |
| *B29C 45/73* | (2006.01) | |
| *B29C 45/74* | (2006.01) | |
| *B29C 45/76* | (2006.01) | |
| *G05B 19/042* | (2006.01) | |
| *H02K 7/14* | (2006.01) | |
| *B29C 45/60* | (2006.01) | |
| *B29C 45/77* | (2006.01) | |
| *B29C 45/78* | (2006.01) | |
| *B29C 45/50* | (2006.01) | |
| *B29C 45/17* | (2006.01) | |
| *B29K 105/26* | (2006.01) | |

(52) U.S. Cl.
CPC ............. *B29C 45/40* (2013.01); *B29C 45/47* (2013.01); *B29C 45/60* (2013.01); *B29C 45/73* (2013.01); *B29C 45/74* (2013.01); *B29C 45/76* (2013.01); *B29C 45/77* (2013.01); *B29C 45/78* (2013.01); *G05B 19/042* (2013.01); *H02K 7/14* (2013.01); *B29C 45/5092* (2013.01); *B29C 2045/1792* (2013.01); *B29C 2045/1875* (2013.01); *B29C 2945/76006* (2013.01); *B29C 2945/76257* (2013.01); *B29C 2945/76381* (2013.01); *B29C 2945/76498* (2013.01); *B29C 2945/76665* (2013.01); *B29C 2945/76859* (2013.01); *B29K 2005/00* (2013.01); *B29K 2105/26* (2013.01); *B29K 2995/0008* (2013.01); *G05B 2219/2624* (2013.01)

(56) References Cited

U.S. PATENT DOCUMENTS

| | | | | |
|---|---|---|---|---|
| 3,025,568 A | * | 3/1962 | Hardy | B29C 45/7613 |
| | | | | 425/145 |
| 3,335,461 A | | 8/1967 | Schwartz | |
| 3,771,698 A | * | 11/1973 | Loichen | B29C 45/60 |
| | | | | 222/413 |
| 3,771,935 A | * | 11/1973 | Loichen | B29C 45/70 |
| | | | | 425/146 |
| 3,902,665 A | | 9/1975 | Hendry | |
| 4,025,274 A | | 5/1977 | Uemura et al. | |
| 4,154,536 A | | 5/1979 | Sokolov | |
| 4,183,448 A | | 1/1980 | Nash | |
| 4,311,446 A | | 1/1982 | Hold et al. | |
| 4,699,581 A | * | 10/1987 | Nagasaka | B29C 45/07 |
| | | | | 425/155 |
| 4,867,938 A | * | 9/1989 | Schad | B29C 45/12 |
| | | | | 264/297.2 |
| 5,164,207 A | | 11/1992 | Durina | |
| 5,249,947 A | | 10/1993 | Inaba et al. | |
| 5,363,747 A | | 11/1994 | Clark et al. | |
| 6,059,556 A | | 5/2000 | Koike | |
| 6,109,910 A | | 8/2000 | Sekido | |
| 6,261,081 B1 | | 7/2001 | Speck et al. | |
| 6,887,062 B1 | | 5/2005 | Burg et al. | |
| 7,172,333 B2 | | 2/2007 | Anderson et al. | |
| 7,291,297 B2 | | 11/2007 | Weatherall et al. | |
| 7,431,583 B2 | | 10/2008 | Takatsugi et al. | |
| 7,906,048 B2 | | 3/2011 | Fitzpatrick | |
| 8,062,025 B2 | | 11/2011 | Klobucar et al. | |
| 2002/0084543 A1 | | 7/2002 | Buja | |
| 2003/0034577 A1 | * | 2/2003 | Seta | B29C 45/46 |
| | | | | 264/40.3 |
| 2004/0080064 A1 | | 4/2004 | MacPhee et al. | |
| 2006/0197254 A1 | | 9/2006 | Onishi | |
| 2006/0261521 A1 | | 11/2006 | Beaumont | |
| 2008/0099943 A1 | | 5/2008 | Yamagiwa et al. | |
| 2008/0121497 A1 | | 5/2008 | Esterson et al. | |
| 2009/0115086 A1 | | 5/2009 | Manda | |
| 2010/0072669 A1 | | 3/2010 | Smith et al. | |
| 2010/0295199 A1 | | 11/2010 | Zhang et al. | |
| 2012/0205219 A1 | | 8/2012 | Nickerson et al. | |

FOREIGN PATENT DOCUMENTS

| | | | |
|---|---|---|---|
| GB | 953217 | | 3/1964 |
| GB | 1359126 | * | 7/1974 |

OTHER PUBLICATIONS

International Bureau, "International Search Report and Written Opinion dated Apr. 11, 2016", PCT Patent Application No. PCT/US2015/064045, Apr. 11, 2016, 13 Pages.
International Bureau, "International Search Report and Written Opinion dated Mar. 30, 2016", PCT Patent Application No. PCT/US2015/064073, Mar. 30, 2016, 11 Pages.
International Bureau, "International Search Report and Written Opinion dated Feb. 5, 2016", PCT Patent Application No. PCT/US2015/064110, Feb. 5, 2016, 11 Pages.
U.S. Appl. No. 14/959,921, filed Dec. 4, 2015.
U.S. Appl. No. 14/960,115, filed Dec. 4, 2015.
U.S. Appl. No. 14/960,101, filed Dec. 4, 2015.
U.S. Appl. No. 15/177,271, filed Jun. 8, 2016.
U.S. Appl. No. 15/177,276, filed Jun. 8, 2016.
U.S. Appl. No. 15/177,301, filed Jun. 8, 2016.

* cited by examiner

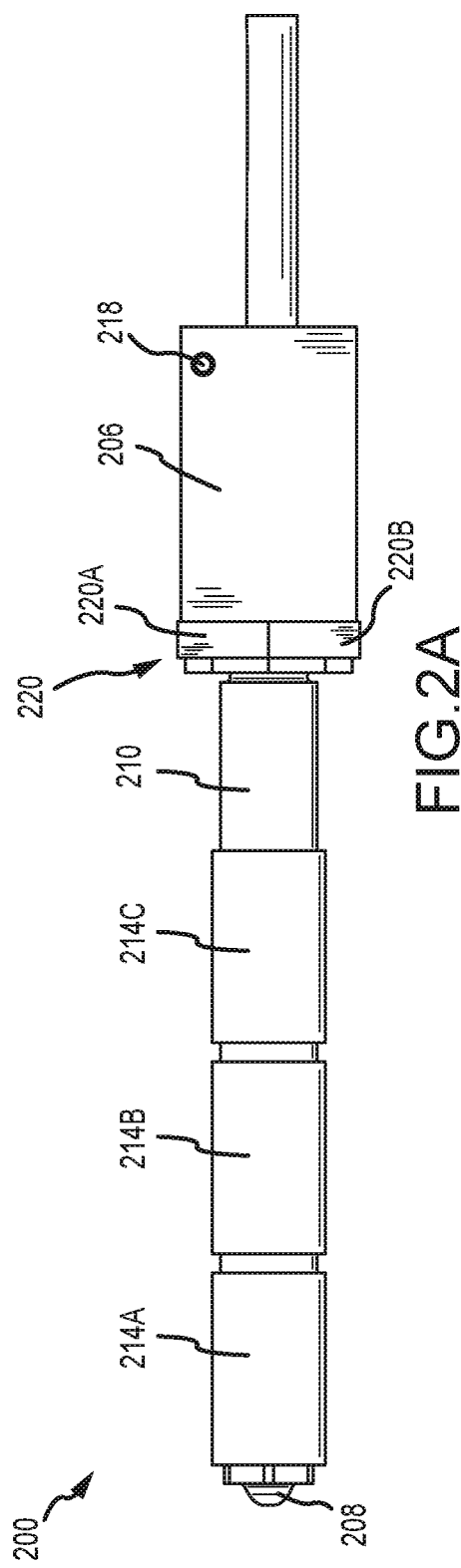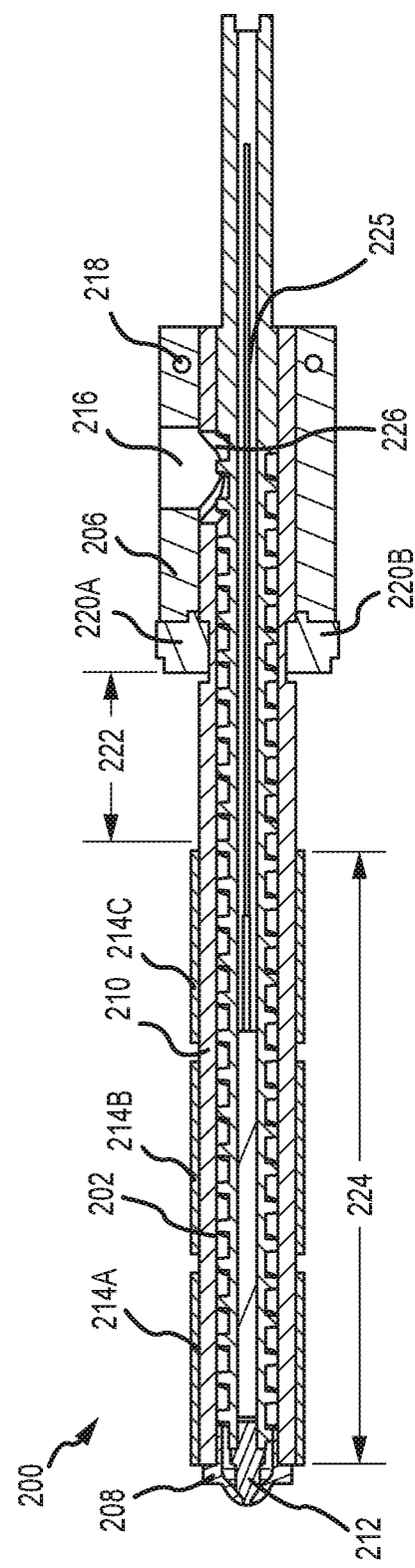

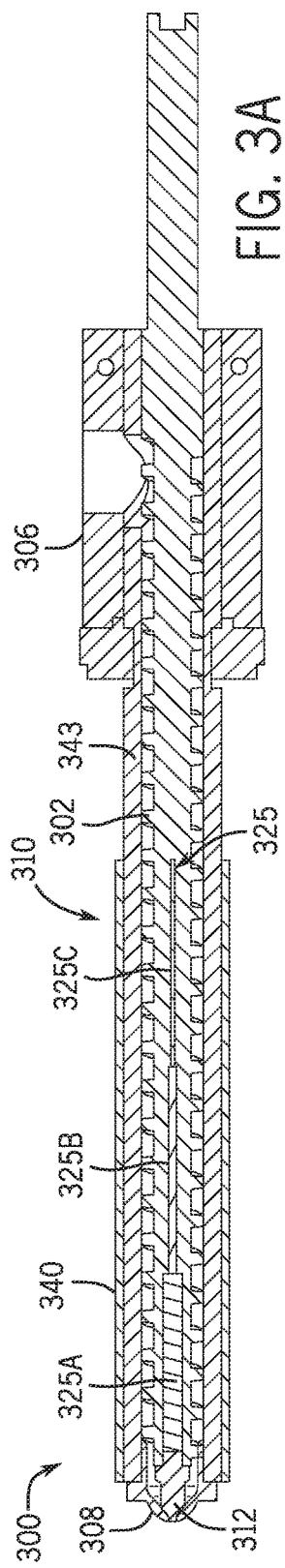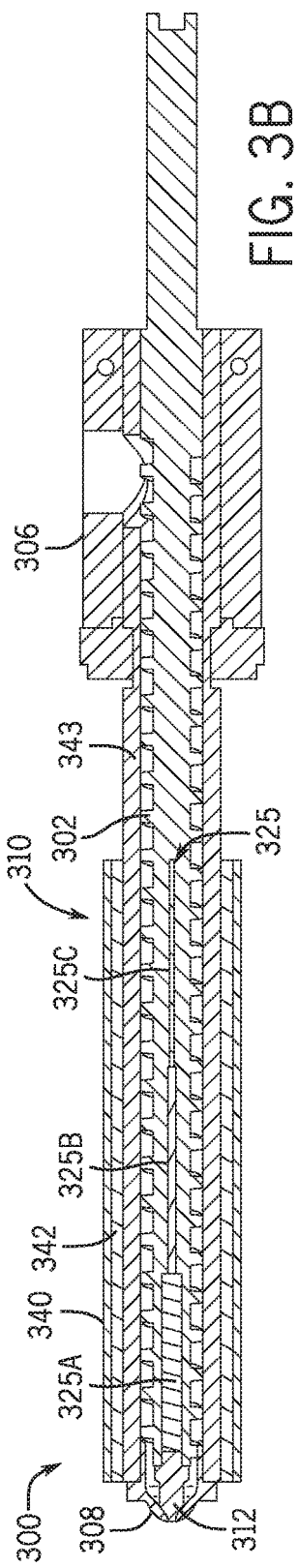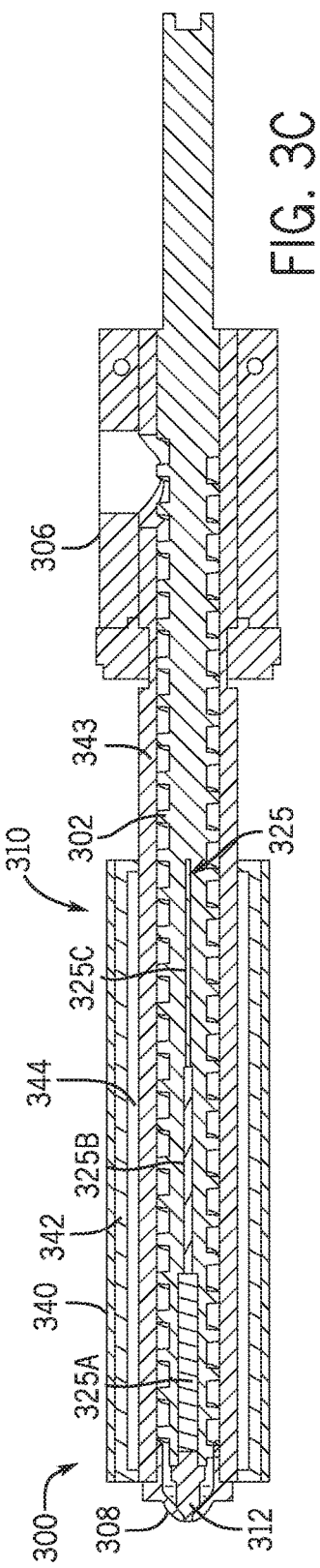

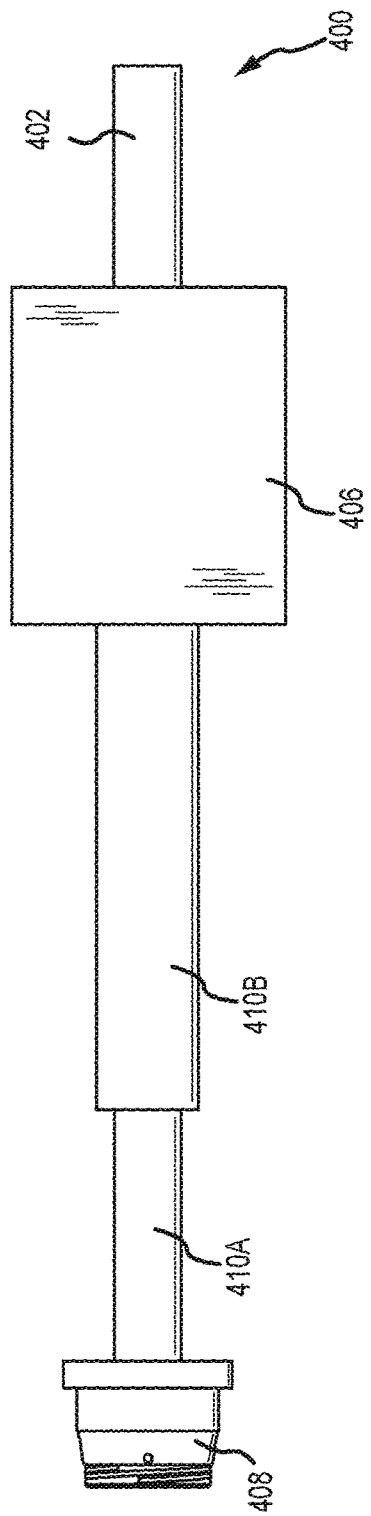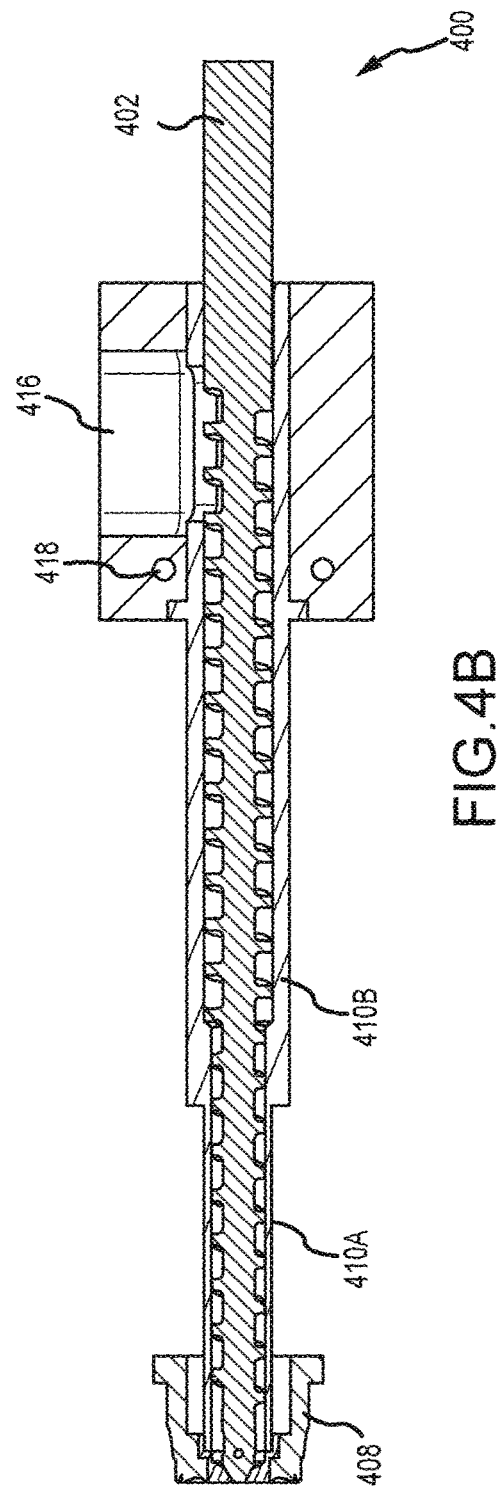
FIG.4A
FIG.4B

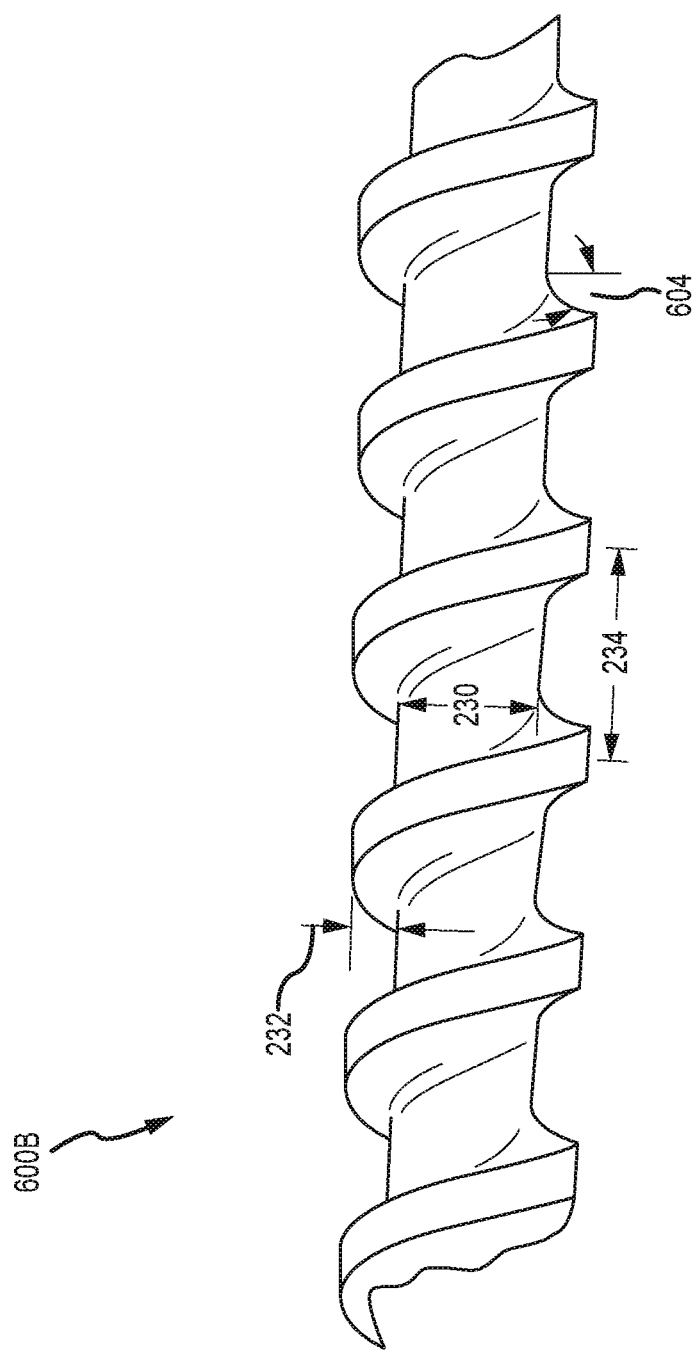

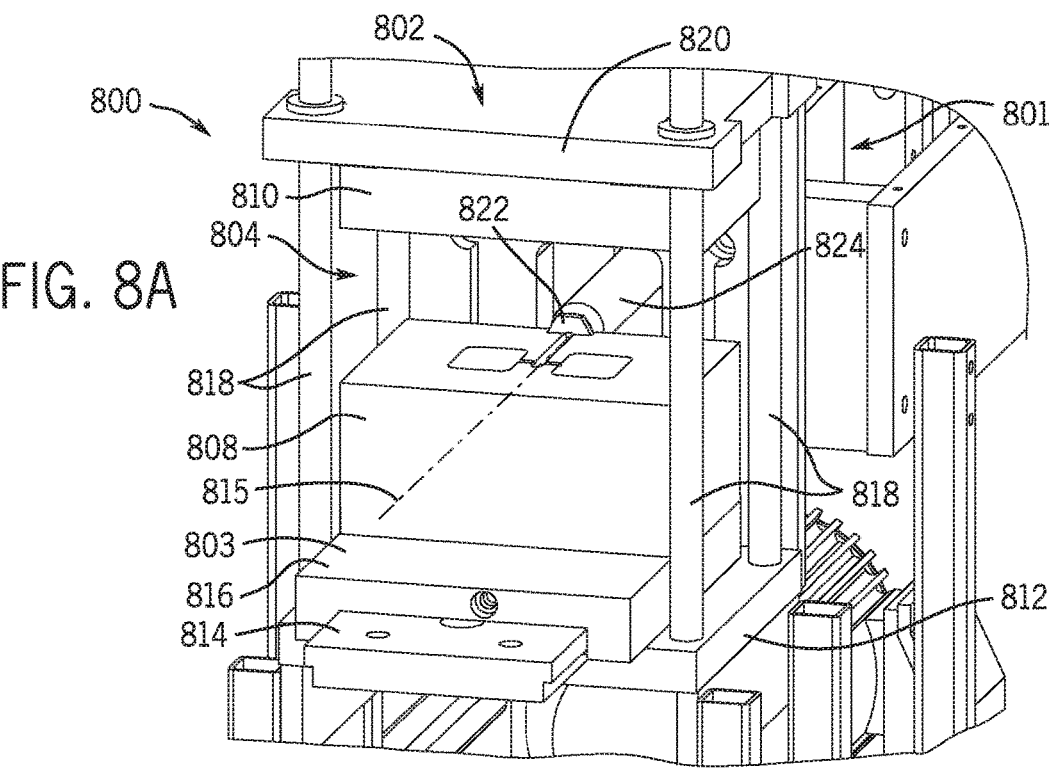
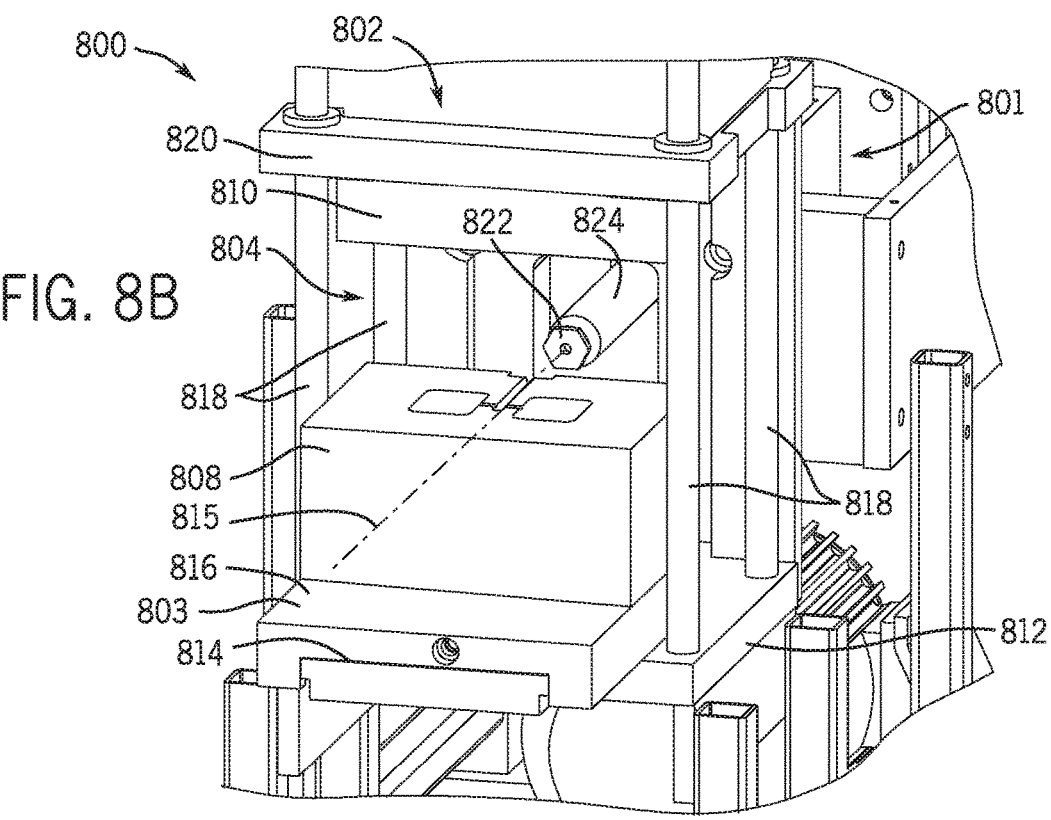

MOLDING MACHINE AND METHOD OF MOLDING A PART

CROSS-REFERENCES TO RELATED PATENT APPLICATIONS

This patent application is a continuation-in-part of U.S. patent application Ser. No. 14/959,921, entitled "Injection Molding System and Method of Fabricating a Component", filed on Dec. 4, 2015, is a continuation-in-part of International Patent Application Number PCT/US2015/064045, entitled "Injection Molding System and Method of Fabricating a Component", filed on Dec. 4, 2015, is a continuation-in-part of U.S. patent application Ser. No. 14/960,115, entitled "Nozzle Shut Off for Injection Molding System", filed on Dec. 4, 2015, is a continuation-in-part of International Patent Application Number PCT/US2015/064110, entitled "Nozzle Shut Off for Injection Molding System", filed on Dec. 4, 2015, is a continuation-in-part of U.S. patent application Ser. No. 14/960,101, entitled "Control System for Injection Molding", filed on Dec. 4, 2015, and is a continuation-in-part of International Patent Application Number PCT/US2015/064073, entitled "Control System for Injection Molding", filed on Dec. 4, 2015, each of which claims the benefit under 35 U.S.C. 119(e) of U.S. Provisional Patent Application No. 62/087,414, entitled "Extrude-to-Fill Injection Molding and Extrusion Screw," filed on Dec. 4, 2014, U.S. Provisional Patent Application No. 62/087,449, entitled "Nozzle Shut-off for Extrude-to-Fill Injection Molding System," filed on Dec. 4, 2014, and U.S. Provisional Patent Application No. 62/087,480, entitled "Control System for Extrude-to-Fill Injection Molding," filed on Dec. 4, 2014, which applications are hereby incorporated herein by reference in their entirety.

FIELD

The present disclosure is directed generally to molding machines. More specifically, the present disclosure is directed to a molding machine and method of molding a part.

BACKGROUND

A traditional injection molding system melts a material, such as a plastic, primarily by shear heat that is dynamically generated by rotation of an extrusion screw. Dynamically generated shear heat in the traditional injection molding system is dependent on the use of petroleum-based plastic resins of a high level of purity and consistency. FIG. 1 is a schematic diagram for a traditional injection molding system 100. An injection zone 112 is located in front of an extrusion screw 102 to hold a molten material prior to injection. A check ring 104, or a non-return valve, is used to allow a forward melt flow during a recovery extrusion stage that is between shots and to prevent the molten material from back flow to the extrusion screw 102. The back flow may occur when an injection pressure is applied to the melt. The material may be molten by using mostly shear heat. For example, the molten state may be created by about 75% shear heat and about 25% conduction heat generated from band heaters 114.

The traditional extrusion screw 102 is designed with a large pitch 132 to promote shear heat generation and mix hot and cold plastic. As shown in FIG. 1, a root diameter 134 of the screw 102 is narrower near a hopper 106 which feeds raw material through an inlet of a barrel 110. Along the length of the extrusion screw toward the nozzle 108, the root diameter increases to create a compression zone to promote shear heat generation. A flight height 136 of the screw 102 decreases toward the nozzle 108, which reduces the space between the screw 102 and the barrel 110.

During a recovery extrusion stage, the molten material is transported along the length of the screw 102 into the injection zone 112 in the barrel 110 by rotating the extrusion screw using a motor 150. The injection zone 112 is between a nozzle 108 and the check ring 104 at the end of the extrusion screw 102. The molten material is trapped in the injection zone by the cold slug, which seals the nozzle 108 after the injection cycle and prevents the plastic from flowing into a mold 140 through a gate 146 and runners 142 during the recovery extrusion stage.

During an injection cycle, the screw 102 is driven forward without rotation under a very high injection pressure by cylinder 138. The screw 102 and check ring 104 can function together as a plunger to inject the molten material into the mold. The recovery extrusion stage may take only 10-25% of the entire molding time such that the shear heat may also be lost when the extrusion screw does not rotate except during the recovery extrusion stage.

The traditional injection molding system 100 relies on the formation of a cold slug in the nozzle 108 between each shot. The cold slug of plastic causes one of the greatest inefficiencies for the traditional injection molding system 100. The cold slug requires a very high pressure to be dislodged from the nozzle 108 to allow a molten material to flow into a mold cavity. The high injection pressure is required to push the molten material into the mold cavity through the runners 142. It is common to require an injection pressure between 20,000 and 30,000 psi in order to obtain a pressure of 500 psi to 1,500 psi in the mold cavity. Due to the high injection pressure, the traditional injection molding system 100 requires a thick wall of the barrel 110, which reduces the heat conduction to the material from the band heaters 114 that surround the barrel 110.

The traditional injection molding system 100 may use either a hydraulic system or an electric motor 128 for powering a clamp system 120, which may include stationary platens 122A-B, a moveable platen 124, and tie rods 126. A clamping cylinder 130 applies sufficient pressure to hold the mold closed during injection. The traditional injection molding system requires large and costly power sources for both the injection system 118 and the clamp system 120. These power sources must be supported by a massive machine structure, which increases facility infrastructure costs including electrical supply, thick concrete footings or floors and oversized HVAC systems that are expensive to procure, operate and maintain.

The shear heat generated by the traditional injection molding system limits its capability to mold certain materials, such as bio-based plastics. Bio-based plastics are degraded by the pressures applied in the traditional injection molding system, reacting adversely to the pressure the machine generates for creating shear heat in process of injection molding petroleum-based plastics. A recently developed injection molding system disclosed in U.S. Pat. No. 8,163,208, entitled "Injection Molding Method and Apparatus" by R. Fitzpatrick, uses static heat conduction to melt plastic, rather than shear heat. The disclosed system can mold bio-based plastics into small parts. Specifically, the disclosed system includes a plunger that is positioned within a tubular screw and runs through the center of the tubular screw. Generally, moving the entire screw forward during the injection cycle would require a large injection cylinder.

In the disclosed system, the entire screw of a larger diameter does not move. Only the plunger is advanced, which requires a much smaller injection cylinder to apply the force on the plunger. The disclosed system recovers and transports the molten material in front of the plunger between each shot or injection cycle, and injects the molten material into a mold by the plunger. The part size is determined by the area of the plunger multiplied by the length of plunger stroke as that defines the volume during injection, but that part size is limited to the small displacement volume of the plunger, typically about 3-5 grains of plastic, which is a small shot size. It is desirable to mold parts with unlimited shot sizes.

Also, the traditional injection molding system 100 requires a manual purging operation by experienced operators at start-up. For example, an operator may first turn on the barrel heaters 114 and wait until the screw 102 embedded in plastic or resin is loosened to allow the screw motor 150 to be turned on. A purging process is required for generating initial shear heat. The purging process begins when the operator rotates the screw 102 to move the resin forward, and the screw 102 is driven backward into its injection position. Then, the operator activates the injection force to drive the screw 102 forward, allowing the resin to exit the nozzle 108 onto the machine bed. The cycling process is repeated to generate initial shear heat until the resin exits from the nozzle 108, which suggests that the material may be hot enough such that the operator may start molding. The manual operation is highly subjective and requires skilled operators to start machines and adjust molding processes. The subsequent molding operations must be consistent without interruptions to satisfy shear heat generation requirements.

Documents that may be related to the present disclosure in that they include various injection molding systems include U.S. Pat. No. 7,906,048, U.S. Pat. No. 7,172,333, U.S. Pat. No. 2,734,226, U.S. Pat. No. 4,154,536, U.S. Pat. No. 6,059,556, and U.S. Pat. No. 7,291,297. These proposals, however, may be improved.

BRIEF SUMMARY

The present disclosure generally provides a molding machine, which may be referred herein as an extrude-to-fill (ETF) molding machine, and a method of molding a part. In some embodiments, the molding machine may include multiple molding systems (e.g., extruders) for pumping molten material into one or more mold cavities. The multiple molding systems may pump the same material or different materials into the one or more mold cavities. The multiple molding systems may be individually and/or collectively controlled. In some embodiments, a method of molding a part may include pumping material into one or more mold cavities via multiple molding systems, ceasing pumping material into the one or more mold cavities when one or more pressures associated with the multiple molding systems are achieved, and releasing a molded part from the one or more mold cavities after the one or more pressures are achieved.

In some embodiments, a molding machine may include a first mold half and two or more extruders associated with the first mold half. Each extruder of the two or more extruders may include a barrel, an extrusion screw inside the barrel, and a nozzle in sealed engagement with the first mold half. Each extruder of the two or more extruders may be controlled independently to cease material flow once a targeted pressure is achieved for the respective extruder. The first mold half may define a single mold cavity, and each extruder of the two or more extruders may be in fluid communication with the single mold cavity. The first mold half defines two or more mold cavities, and each extruder of the two or more extruders may be in fluid communication with a different mold cavity of the two or more mold cavities. The molding machine may include a single hopper operatively coupled to the two or more extruders to supply material to the two or more extruders. The molding machine may include a manifold operatively coupled to the single hopper and the two or more extruders to divert material to respective extruders of the two or more extruders. The two or more extruders may be arranged in a matrix. The two or more extruders may be oriented substantially parallel to one another, and at least two of the two or more extruders may be positioned one above the other along a vertical dimension of the first mold half. The molding machine may include a controller monitoring the pressure for each extruder of the two or more extruders and configured to release a clamp force applied to the first mold half to release a part molded therein once each extruder of the two or more extruders achieves its targeted pressure. The targeted pressure for each extruder of the two or more extruders may be based on the area of the first mold half into which the respective extruder is extruding material. The two or more extruders may include four or more extruders spaced apart from one another. The two or more extruders may be identical to or different from one another. The two or more extruders may be operable to extrude the same material or different materials into the first mold half.

In some embodiments, a molding machine includes a first mold half, a first extruder associated with the first mold half, and a second extruder associated with the first mold half. The first extruder may include a first barrel, a first extrusion screw inside the first barrel, and a first nozzle in sealed engagement with the first mold half. The second extruder may include a second barrel, a second extrusion screw inside the second barrel, and a second nozzle in sealed engagement with the first mold half. The first and second extruders may be controlled independently to cease material flow through the first and second extruders once first and second pressures are achieved for the first and second extruders, respectively. The first mold half may define a single mold cavity, and the first and second extruders may be in fluid communication with the single mold cavity. The first mold half may define a first mold cavity and a second mold cavity, the first extruder may be in fluid communication with the first mold cavity, and the second extruder may be in fluid communication with the second mold cavity. The molding machine may include a single hopper operatively coupled to the first and second extruders to supply material to the first and second extruders. The molding machine may include a manifold operatively coupled to the single hopper, the first extruder, and the second extruder to divert material to the first and second extruders. The first and second extruders may be oriented substantially parallel to each other and substantially perpendicular to the first mold half. The molding machine may include a third extruder and a fourth extruder. The first, second, third, and fourth extruders may be arranged in a matrix. The first, second, third, and fourth extruders may be uniformly spaced apart from one another. The molding machine may include a controller monitoring the pressure of the first and second extruders and configured to release a clamp force applied to the first mold half to release a part molded therein once the first and second pressures are achieved. The first and second extruders may be identical to or different from each other. The first and second extruders may be operable to extrude the same material or different materials into the first mold half.

In some embodiments, a method of molding a part includes extruding a first material through a first nozzle of a first extruder in sealed engagement with a first mold half, extruding a second material through a second nozzle of a second extruder in sealed engagement with the first mold half, ceasing extrusion of the first material through the first nozzle when a first pressure associated with the first extruder is achieved, ceasing extrusion of the second material through the second nozzle when a second pressure associated with the second extruder is achieved, and releasing a molded part from the first mold half after both the first and second pressures are achieved. Extruding the first material and extruding the second material may include extruding the first and second materials into the same cavity defined by the first mold half. Extruding the first material and extruding the second material may include extruding the first and second materials into different cavities defined by the first mold half. The first pressure is different than the second pressure. The first extruder may be identical to or different from the second extruder.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

The present disclosure is provided to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 2A is a molding system with an extrusion screw in accordance with embodiments of the present disclosure.

FIG. 2B is a sectional view of the molding system of FIG. 2A in accordance with embodiments of the present disclosure.

FIG. 3A is a sectional view of a molding system including induction heating in accordance with embodiments of the present disclosure.

FIG. 3B is a sectional view of the molding system of FIG. 3A including a thermally-insulative sleeve in accordance with embodiments of the present disclosure.

FIG. 3C is a sectional view of the molding system of FIG. 3B including an insulative air gap between the sleeve and an inner tubular structure of the barrel in accordance with embodiments of the present disclosure.

FIG. 4A is a molding system with a stepped extrusion screw in accordance with embodiments of the present disclosure.

FIG. 4B is a sectional view of the molding system of FIG. 4A in accordance with embodiments of the present disclosure.

FIG. 6B illustrates an extrusion screw having a less sharp geometry in accordance with embodiments of the present disclosure.

FIG. 8A is a perspective view of a molding system with a shuttle table in a first position in accordance with embodiments of the present disclosure.

FIG. 8B is a perspective view of a molding system with a shuttle table in a second position in accordance with embodiments of the present disclosure.

DETAILED DESCRIPTION

Figure 1:
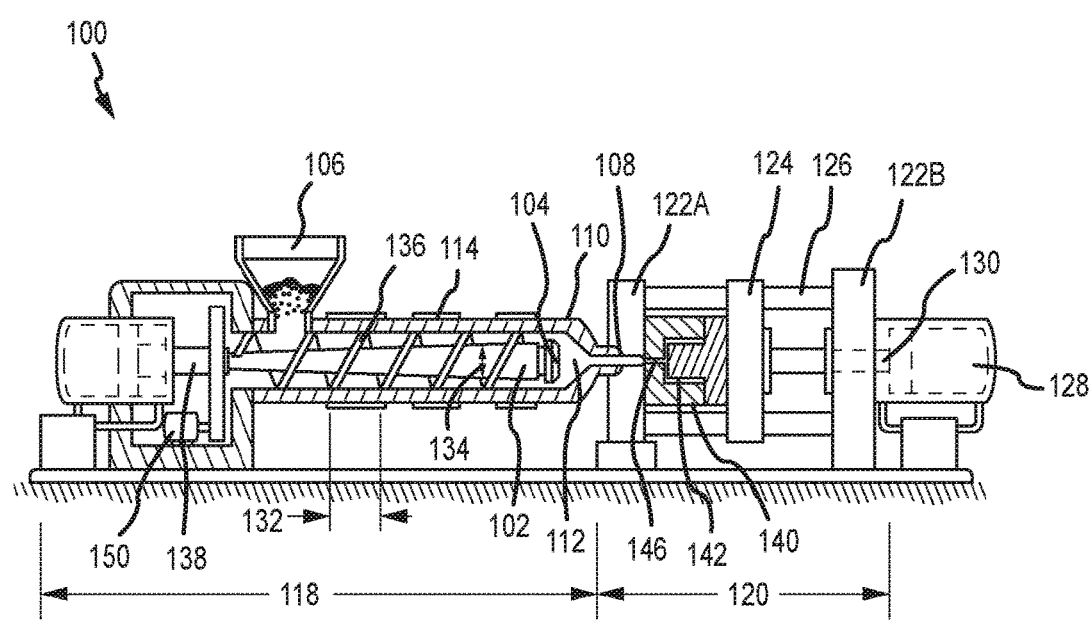
FIG. 1 is a schematic diagram of a traditional injection molding system.

The present disclosure may be understood by reference to the following detailed description, taken in conjunction with the drawings as described below. It is noted that, for purposes of illustrative clarity, certain elements in various drawings may not be drawn to scale.

The present disclosure generally provides a molding machine, which may include a molding system and a clamp system. The molding system may include an extrusion screw that extrudes on demand to transfer or pump molten material into a mold with an unlimited or varying shot size or volume of displacement, without requiring a purging process after periods of idle time. In traditional injection molding systems, the shot size is fixed and is the material volume that can be displaced or transferred into the mold during an injection cycle, sufficient to fill a single mold cavity or a plurality of mold cavities. The varying shot size of the ETF molding system is different from the fixed shot-size of traditional injection molding systems, in which the shot size is predetermined by the screw diameter and the length of injection stroke, which is the axial distance traveled by the traditional screw 102 (see FIG. 1) during an injection cycle. The traditional injection molding system 100 (see FIG. 1) executes a fixed, sequential process in which shot size changes require changes to the control settings. The ETF molding system may extrude plastic for a specific time, until a specific mold cavity pressure is achieved, until a specific screw back pressure is achieved, until a specific screw torque load is achieved, or for a pre-selected number of screw rotations to mold parts with various dimensions to provide any desired shot size.

The ETF molding system may use heat conduction to produce a homogenous melt (for example, a molten resin material) with substantially reduced shear heat generation. The melt may be heated to obtain a desired viscosity. By achieving the desired viscosity in a static state, less pressure may be required for extrusion to fill a mold cavity. Also, a lower clamp force may be required for closing and holding the mold.

The ETF molding system may include a screw designed to function as a conveying pump for extruding molten material under a pressure sufficiently high enough to fill a mold cavity. The screw may rotate in two opposing directions. One of the benefits of reversing rotation of the screw is to help agitate and mix the resin. When the extrusion screw rotates in one direction to pump the resin material into a mold cavity, a pattern of flow and pressure may be established. The reversal of the rotation of the screw may disrupt the pattern of flow and disrupt the hysteresis of the resin material, which may decompress the barrel between molded-part shots and may allow more accurate control of the molding system. The screw may promote heat conduction to material inside a barrel. For example, reversal of the screw may mix the resin material to enhance heat conduction to achieve more consistent melt viscosity and ensure a more uniform extrudant. The screw may include an internal heat source, such as a heater placed inside the screw, to assist heat conduction to material inside the barrel. The screw may be formed of a thermally conductive material, such as brass, to efficiently conduct heat from the internal heat source to the material. In some embodiments, the screw may reciprocate along the axial direction to open or close a nozzle to allow or prevent, respectively, flow of resin material into a mold cavity.

The molding system may extrude material without the high pressures, commonly 20,000 to 30,000 psi, found in the traditional injection molding system 100. The traditional injection molding system 100 uses thick walled barrels and heavy screws designed to generate and contain the high pressure and to move material within the high pressure system 100. By operating at lower pressures, which may be as low as 5-10% above the pressure in an associated mold cavity, the ETF molding system may be constructed of non-traditional materials and configurations that withstand significantly lower pressures. The lower pressure requirements of the molding system may facilitate use of non-traditional materials, which may be softer and lighter in weight than traditional materials. For example, the screw in the molding system may be built with significantly less mass due to the lower pressure environment, and therefore may create less of a heat sink in the center of the system when utilizing external heat sources. The non-traditional materials may improve thermal conductivity or insulation, improve surface coefficient of friction, or other such properties, which may improve the melting and pumping of materials through the molding system. For example, the screw and/or barrel may be made from thermally-conductive materials that are not used in traditional injection molding systems because of lack of strength, such as brass alloys, copper alloys, and copper nickel alloys.

Figure 2C:
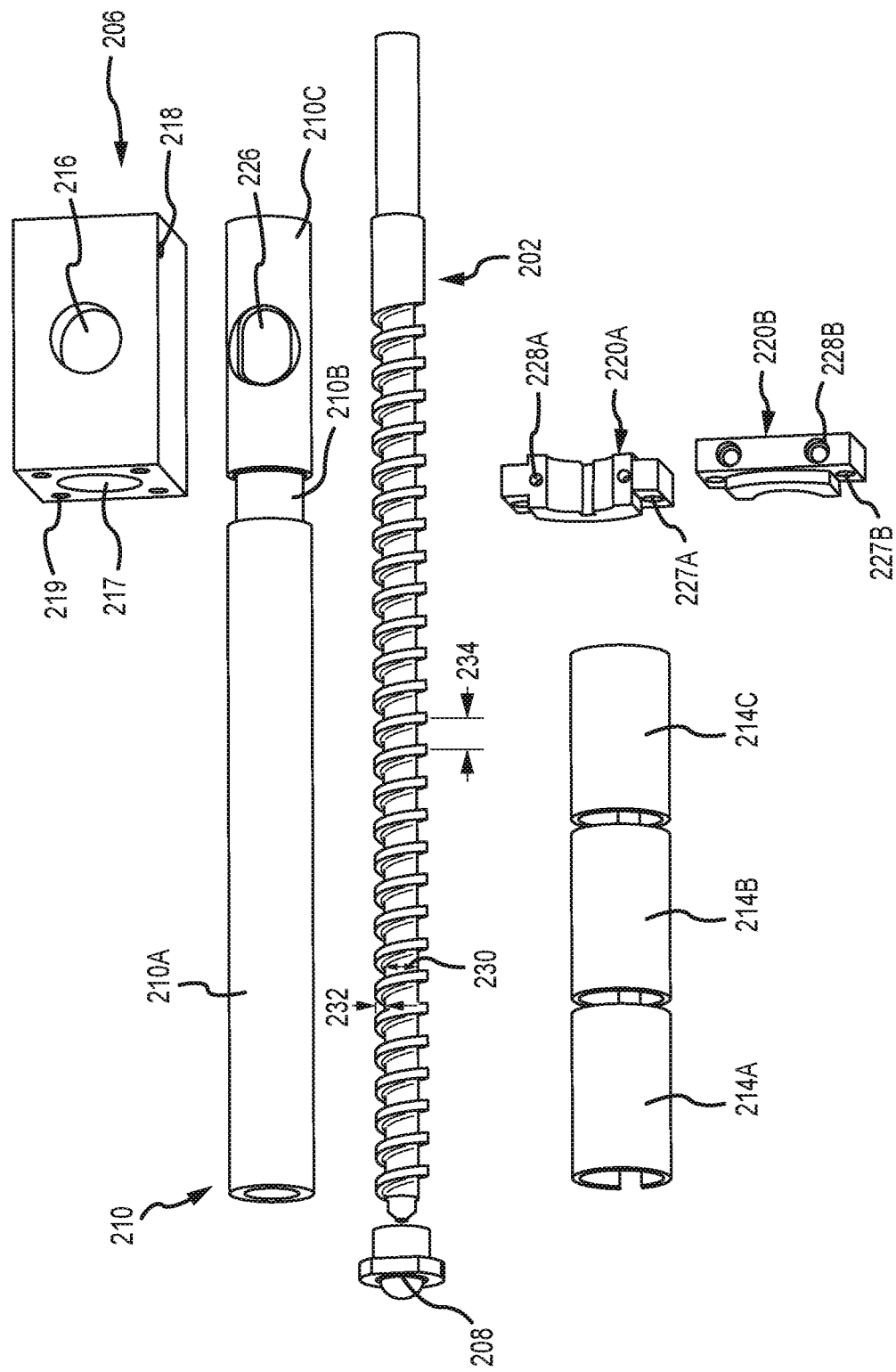
FIG. 2C is a perspective view of the molding system of FIG. 2A prior to assembly in accordance with embodiments of the present disclosure.

FIG. 2A illustrates a molding system 200 in accordance with embodiments of the present disclosure. FIG. 2B is a sectional view of the molding system 200 illustrated in FIG. 2A. FIG. 2C is a perspective view of the components of the molding system 200 illustrated in FIG. 2A prior to assembly.

Referring generally to FIGS. 2A-2C, the molding system 200 rimy include an extrusion screw 202 positioned inside a barrel 210 (see FIG. 2B). A hopper block opening 216 may be associated with barrel inlet 226 for transferring material, typically in the form of pellets, from a hopper block 206 to the barrel 210, and a nozzle 208 may be associated with an end of the barrel 210 for transferring molten material from the barrel 210 to a mold. One or more heaters 214 may heat the material inside the barrel 210 into a molten state, and the extrusion screw 202 may rotate within the barrel 210 to pump the material along a length of the barrel 210 and into the mold. A motor or other drive system may be used to rotate the extrusion screw 202. A cylinder may be coupled to the extrusion screw 202 or the barrel 210 to move one of the screw 202 or the barrel 210 in an axial direction relative to the other of the screw 202 or the barrel 210 to open or close the nozzle 208.

The molding system 200 may be associated with a clamp system, which may include a cylinder or an electric motor for powering the clamp system. The clamp system may include one or more stationary platens, a moveable platen, and one or more tie rods. A clamping cylinder may apply pressure to the moveable platen to hold a mold closed during extrusion of molten material from the nozzle 208 of the molding system 200 into the mold. The molding system 200 may primarily use static heat conduction, rather than shear heat generation, to melt the material within the barrel 210. By achieving a desired viscosity primarily using static heat conduction, a lower pressure may be required for extruding the material into the mold and thus a lower clamp force may hold the mold in a closed position. As such, the molding system 200 and the clamp system, including the cylinder or electric motor for powering the clamp system, may be smaller in size and require less power to operate than the traditional injection molding system 100, which generally requires large and costly power sources for both the injection system 118 and the clamp system 120 (see FIG. 1). The power source for the traditional injection molding system 100 typically must be supported by a massive machine structure, which increases facility infrastructure costs including electrical supply, thick concrete footings or floors, and oversized HVAC systems that are expensive to procure, operate, and maintain.

Referring still to FIGS. 2A-2C, the barrel 210 of the molding system 200 may enclose the extrusion screw 202. More details about the extrusion screw are shown in FIG. 2C. A clearance between the extrusion screw 202 and the barrel 210 may be sized to avoid shear heat generation and allow rotation of the extrusion screw 202 within the barrel 210. The barrel 210 may allow an axial movement of the extrusion screw 202 inside the barrel 210.

The molding system 200 may operate at a lower pressure than the traditional injection molding system 100. The lower operating pressure may allow the barrel 210 to have a thin wall, which may provide better heat conduction to the material inside the barrel 210 (see FIGS. 2A-2C) than the thick wall of the traditional barrel 110 (see FIG. 1). For example, the wall thickness of the barrel 210 may be 0.125 inches to 0.250 inches thick, compared to a wall thickness of the barrel 110 of 0.750 inches to 2.00 inches on the traditional injection molding system 100 (see FIG. 1). The static heat conduction, along with a shut-off nozzle and a screw tip discussed below, may reduce the internal barrel pressure compared to the traditional injection molding system 100.

The materials for forming the barrel 210 may be selected based on heat conduction more than pressure containment as a result of low extruding or injection pressure. For example, the barrel 210 may include magnetic material for inductive heating or highly conductive material such as brass, copper, aluminum, or alloys thereof. In some embodiments, the barrel 210 may be formed of steel.

The hopper block 206 of the molding system 200 of FIGS. 2A-2C may include an opening 216 coupled to an inlet 226 of the barrel 210. The hopper block 206 may include a hollow portion 217 configured to slide onto the barrel 210. The hopper block 206 and the barrel 210 may be assembled such that a material in the hopper block 206 may be drawn or fed into the barrel 210 through the hopper block opening 216 and the barrel inlet 226. The hopper block 206 may include one or more cooling channels 218 for circulating cooling fluid, such as water, water based compounds, or other cooling compounds, such that the extrusion screw 202 and the barrel 210 near the hopper block 206 may remain cold, for example, at room temperature.

The molding system 200 may heat material inside the barrel 210 to prepare the material for extrusion into a mold. For example, as illustrated in FIGS. 2A-2C, the molding system 200 may include a number of external heaters, such as band heaters 214A-214C, for heating material inside the barrel 210. The band heaters 214A-214C may be located outside the barrel 210 and may conduct heat through the barrel 210 to the material located inside the barrel 210. By heating the barrel 210, the band heaters 214A-214C may transfer sufficient heat to the material located inside the barrel 210 to melt the material for extrusion into a mold. The heat from the band heaters 214A-214C may be conducted through the barrel 210 and radiated into an annular space defined between the barrel 210 and the screw 202 into which the material is received. Heat from the heated annular space may be transferred to the screw 202, which may in turn heat the material along an interface between the screw 202 and the material. The screw 202 may include flights disposed adjacent an inner diameter of the barrel 210, and thus heat from the barrel 210 may be conducted through the flights of the screw 202 to heat the material within the barrel 210. The height of the screw flights may define the depth of the annular space between the screw 202 and the barrel 210. As illustrated in FIGS. 2A and 2B, the band heaters 214A-214C may enclose the barrel 210 when the molding system 200 is assembled to transfer heat to the material inside the barrel 210. The band heaters 214A-214C may be electric heaters.

Referring to FIGS. 2A and 2B, the band heaters 214A-214C may be spaced along a length of the barrel 210. The band heater 214C closest to the hopper block 206 may be placed at a distance from a barrel collar 220, which may include two portions 220A and 220B at a front end of the hopper block 206. Referring to FIG. 2B, the band heater 214C may be placed at a distance from the hopper block 206 such that a temperature transition region 222 in the barrel 210 may be present between the hopper block 206 and a heated region 224 where the heaters 214A-C are located. In the temperature transition region 222, the material may remain relatively cold and may act like a seal between the outside diameter of the screw 202 and the inside diameter of the barrel 210 to drive molten material in the heated region 224 toward a mold to continuously transport the material to flow into the mold. The temperature transition region 222 may be designed such that the material in the transition region 222 has enough volume to act like a seal to drive the molten material in the heated region 224 into a mold. For example, the temperature transition region 222 may include a length that may vary depending on the application of the molding system 200 and may be determined on a case-by-case basis. By maintaining an adequate temperature transition region 222 between the cold material entering the barrel 210 from the hopper block 206 and the melted material in the heated region 224, the cold material and the transition material may work with the screw auger 202 to provide an extrusion force to pump the melted material in the heated region 224. When the melted material is too close to the hopper 206, the extrusion force may be lost. The presence of an adequate amount of cold material in the temperature transition region or zone 222 may ensure the cold material slides along the screw geometry to move the melted material along the heated region 224 toward the mold. If the cold material does not slide along the screw in the transition zone 222, then the melted material may stick to the screw 202 in the heated region 224 and may spin around inside the barrel 210 with the screw 202.

The molding system 200 may include an internal heat source for heating the material located inside the barrel 210. Referring to FIG. 2B, one or more resistive heaters 225, such as cartridge heaters, may be received inside the screw 202. The resistive heaters 225 may internally heat the screw 202, and the screw 202 may transfer the heat to the molding material located between the screw 202 and the barrel 210. The molding system 200 may include multiple resistive heaters 225 arranged axially along a length of the screw 202, and the resistive heaters 225 may be independently controlled to provide varying temperatures along the length of the screw. The molding system 200 may include a slip ring to deliver electric power to the resistive heaters 225. The slip ring may include a fixed end for connection of power and a rotating end that rotates with the screw 202 for providing electrical connectivity to the resistive heaters 225 while the screw 202 is rotating. A thermocouple may be added to provide feedback to control the resistive heaters 225, and the slip ring may provide connection of leads of the thermocouple to provide thermocouple readings for more efficient conduction of heat to the material between the screw 202 and the barrel 210.

In some embodiments, the molding system 200 may heat the molding material between the screw 202 and the barrel 210 via induction heating to facilitate rapid heating of the molding material. In the following description, elements or components similar to those in the embodiment of FIGS. 2A-2C are designained with the same reference numbers increased by 100 and redundant description is omitted. Referring to FIGS. 3A-3C, a molding system 300 may include a magnetic screw 302 and/or barrel 310. The screw 302 and/or the barrel 310 may be heated by electromagnetic induction caused by an alternating magnetic field generated by an induction heater. The induction heater may include an electromagnet, such as inductive heating coil 340, and an electronic oscillator may pass an alternating current through the electromagnet to generate an alternating magnetic field that penetrates and heats the screw 302 and/or barrel 310 to thereby heat raw material located between the screw 302 and the barrel 310. As illustrated in FIGS. 3A-3C, the inductive heating coil 340 may surround the barrel 310 for generating a magnetic field that heats the screw 302 and/or the barrel 310. The screw 302 and/or the barrel 310 may be formed of a magnetic material, such as carbon steel, for interacting with the magnetic field, thereby heating the screw 302 and/or the barrel 310. In some embodiments, the screw 302 and/or the barrel 310 may be formed at least partially of a ferromagnetic material, which may result in at least a portion of the screw 302 and/or the barrel 310 being magnetic. Induction heating may be used to facilitate quicker response time than electric heaters, and induction heating may instantly or rapidly heat the screw 302 and/or the barrel 310. In some embodiments, the screw 302 and/or the barrel 310 may include at least a magnetic portion or section to facilitate quicker response time. In some embodiments, the barrel 310 may be constructed from a magnetic material to promote inductive heating and may work in concert with the screw 302, such as a magnetic material placed inside the screw 302. A heat source may be the material of the screw 302, the barrel 310, and/or a covering of the barrel 310 working with a magnetic field generated by an electromagnet (such as inductive heating coil 340) to create induction heating.

In some embodiments the screw 302 may be formed of a magnetic material for interaction with the magnetic field of the electromagnet, such as inductive heating coil 340, and the barrel 310 may be formed of ceramic, a carbon fiber, glass fiber, or other thermally-insulative material. For example, as illustrated in FIG. 3A, the electromagnet, such as inductive heating coil 340, may inductively heat the screw 302, which in turn may heat the molding material disposed between the screw 302 and the barrel 310. The barrel 310 may thermally insulate the molding material and the screw 302 to retain heat within the space defined between the screw 302 and the barrel 310.

Referring to FIGS. 3B and 3C, the barrel 310 may include an insulating sleeve 342 surrounding an inner tubular structure 343. The sleeve 342 may be formed from ceramic, carbon fiber, glass fiber, or other thermally-insulative material to isolate and control the environment within the barrel 310. The sleeve 342 may circumferentially contact the inner tubular structure 343, as illustrated in FIG. 3B, or the sleeve 342 may be radially spaced from the inner tubular structure 343 by an insulating air gap 344 to further retain the heat within the barrel 310. In the illustrative embodiments of FIGS. 3B and 3C, the inner tubular structure 343 may be formed from a thermally-insulative material to insulate the environment inside the barrel 310. Alternatively, the inner tubular structure 343 may be formed from a magnetic material, such as carbon steel, to interact with the magnetic field of the electromagnet, such as inductive heating coil 340, and may heat the molding material in concert with the screw 302, and the sleeve 342 may retain the heat within the barrel 310.

With continued reference to FIGS. 3A-3C, the screw 302 may define an at least partially hollow core for receiving a single heat source or a plurality of heat sources to obtain specific heat profiles within the screw 302. For example, the screw 302 may be at least partially formed of a magnetic material and/or include a magnetic material, such as one or more magnetic inserts, inside the screw 302. As illustrated in FIGS. 3A-3C, one or more magnetic inserts 325 may be received inside the screw 302. The one or more inserts 325 may interact with the magnetic field of the inductive heating coil 340 to internally heat the screw 302. The inserts 325A-325C may have different sizes or mass to provide different heat generation along the length of the screw 302.

As illustrated in FIGS. 3A-3C, the inserts 325A-325C may be positioned along the length of the screw 302 such that the largest insert 325A is located near the tip of the screw 302, the smallest insert 325C is located near the hopper block 306, and the middle insert 325B is located intermediate the other inserts 325A, 325B. The insert 325A located near the tip of the screw 302 may have a larger size than the other magnetic inserts 325B, 325C, resulting in more heat being applied to the tip area of the screw 302 to ensure the material inside the barrel 310 is sufficiently melted prior to flowing through a nozzle attached to the barrel 310 into a mold cavity. The insert 325C may have a smaller size than the other magnetic inserts 325A, 325B, resulting in less heat being applied to the screw 302 near the hopper block 306. The inserts 325A, 325B, 325C may interact with the magnetic field of the electromagnet, such as inductive heating coil 340, to generate different amounts of heat along the length of the screw 302, thereby applying different amounts of heat to the raw material located between the screw 302 and the barrel 310.

The screw 302 may be formed from a magnetic material, and thus may interact with the magnetic field to create a baseline amount of heat for heating the raw material, and the inserts 325A-325C may supplement the heat generated by the screw 302 to progressively heat the material along the length of the screw 302. The inserts 325A-325C may vary in size according to the heat requirements of a particular molding application. In some embodiments, the insert 325A may be approximately ⅜" in diameter, the insert 325B may be approximately ¼" in diameter, and the insert 325C may be approximately 3/16" in diameter. By using different size inserts 325A, 325B, 325C, a single electromagnet (such as inductive heating coil 340) may be positioned around the screw 302 and barrel 310. The inserts 325A-325C may be formed at least partially of a magnetic material, such as carbon steel.

Referring to FIGS. 2A-3C, the molding system 200, 300 may include a shut-off nozzle 208, 308 at the end of the barrel 210, 310. The molding system 200, 300 may include a screw tip 212, 312 matched to the nozzle 208, 308 to seal the nozzle 208, 308 between shots. The screw tip 212, 312 may displace substantially all molten material from the nozzle 208, 308 such that no cold slug may be formed inside the nozzle 208, 308. For example, as illustrated in FIGS. 2B and 3A-3C, the screw tip 212, 312 may include a substantially cylindrical tip portion for displacing material from within an opening or orifice of the nozzle 208, 308, and may further include an angled portion for displacing material from an interior surface of the nozzle 208, 308 extending radially outwardly from the orifice. The angled portion of the screw tip 212, 312 may include a leading conical or frustoconical surface for engagement with a corresponding interior surface of the nozzle 208, 308. The angled portion may extend outwardly and rearwardly from the tip portion. The combination of the screw tip portion and the angled portion of the screw tip 212, 312 may displace substantially all material from the nozzle 208, 308. The nozzle 208, 308 may extend to and engage the mold, and thus may lose heat through the engagement with the mold. By displacing substantially all material from the nozzle 208, 308, which may be cooled by the mold, the screw tip 212, 312 may restrict the formation of a cold slug in the nozzle 208, 308. The angled portion of the screw tip 212, 312 may displace molten material a sufficient distance away from the nozzle orifice to ensure the molding material near the front of the screw 208, 308 is at a desired melt temperature when the screw 202, 302 begins to rotate and extrude material into the mold. A cylinder may be used at the back of the screw 202, 302 to ensure the screw tip 212, 312 is seated in the nozzle 208, 308 to displace all molten material from nozzle area. The shut-off nozzle 208, 308 may allow a low pressure extrusion because no cold slug is formed, and thus, unlike the traditional injection molding system 100 (see FIG. 1), a cold slug is not required to be dislodged from the nozzle prior to injecting material into the mold. The screw tip 212, 312 may be placed against the nozzle 208, 308 to seal or close the nozzle 208, 308, which may be connected to an end of the barrel 210, 310. The extrusion screw 202, 302 may include a hollow portion such that a resistive heater or other heating device and thermocouple may be placed inside the extrusion screw 202, 302. The details of the screw tip design are disclosed in a related U.S. Provisional Patent Application 62/087,449, entitled "Nozzle Shut-off for Extrude-to-Fill Injection Molding System," and in related U.S. patent application Ser. No. 14/960,115, entitled "Nozzle Shut Off for injection Molding System", filed on Dec. 4, 2015, and in related international Patent Application Number PCT/US2015/064110, entitled "Nozzle Shut Off for Injection Molding System", filed on Dec. 4, 2015, which applications are incorporated herein by reference in their entirety.

The molding system 200, 300 may include a drive system for rotating the extrusion screw 202, 302. For example, the molding system 200, 300 may include an extrusion motor which rotates the screw 202, 302 and may be controlled by electric current for driving the screw rotation. The motor may drive the screw 202, 302 using a drive belt or chain. The molding system 200, 300 may include an extrusion motor that is axially aligned with the extrusion screw 202, 302 as a direct drive, making the molding system 200, 300 a discreet unit facilitating the use of multiple molding systems 200, 300, which may be referred to as extruders, on a single machine (e.g., see FIG. 8). The molding system 200, 300 may include a cylinder that moves the screw tip 212, 312 into contact with the inside of the nozzle 208, 308 or mold gate. The cylinder may move the extrusion screw 202, 302 forward relative to the barrel 210, 310 to bring the screw tip 212, 312 into contact with the nozzle 208, 308 to close or shut off the nozzle 208, 308 or may move the barrel 210, 310 rearward relative to the screw 202, 302 to bring the nozzle 208, 308 into contact with the screw tip 212, 312 to close or shut off the nozzle 208, 308.

As shown in FIG. 2C, the extrusion screw 202 may have a constant root diameter 230 unlike the varying root diameter of the traditional extrusion screw 102 (see FIG. 1). The extrusion screw 202 may use a comparatively small pitch 234 rather than the large pitch 132 of the traditional extrusion screw 102 as shown in FIG. 1. The small pitch 234 may be designed to help pump the material into the mold while the large pitch 132 of the traditional extrusion screw 102 is more suitable for promoting shear heat generation.

Referring still to FIG. 2C, screw dimensions, including screw length, screw root diameter, and screw flight height 232, may affect the shot size or part size or accuracy. For example, a large part may be molded by extruding with a screw including, for example, a long screw length, a large root diameter, or a tall screw flight height 232. When the diameter of the extrusion screw becomes small, the volume of plastic extruded efficiently may be reduced, but the control of the volume extruded may be more accurate, which helps control the shot size to be consistent for each molding cycle.

The extrusion screw 202, 302 may be made of brass or a brass alloy, which has higher heat conduction capabilities than commonly used steel in the traditional injection molding system. A brass screw may conduct heat to the material better than a steel screw, and the material, such as plastic, may move more freely along its surface, promoting mixing. Brass has a low coefficient of friction, which may help boost a pumping efficiency, especially for molding sticky materials, such as mixed/contaminated recycled resin, or starch based resins. The pumping efficiency is a measure of a volume of material pumped into a mold per unit time.

With continued reference to FIG. 2C, the barrel 210 may include a transition section 210B between a main section 210A and an entrance section 210C. The transition section 210B may have a smaller outer diameter configured to fit to the barrel collar 220 including two portions 220A-220B. The entrance section 210C may include the inlet 226 coupled to the opening 216 of the hopper block 206. Referring to FIGS. 2A, 2B, and 2C, when the molding system 200 is assembled, the heaters 214A-214C may surround the main section 210A of the barrel 210, and the collar 220 may be seated in the transition section 210B of the barrel 210. The portions 220A-220B of the collar 220 may be positioned on the transition section 210B of the barrel 210 and may be attached to each other, for example, with fasteners threaded into holes 228A-228B formed in the collar portions 220A-220B. When secured together, the collar portions 220A-220B may resist rotation of the collar 220 relative to the barrel 210, and the recessed transition section 210B of the barrel 210 may inhibit axial movement of the collar 220 along the length of the barrel 210. The collar 220 may be attached to the hopper block 206 to axially and rotationally fix the hopper block 206 to the barrel 210. The barrel collar 220 may be attached to the hopper block 206, for example, by using fasteners inserted through holes 227A-227B formed in the collar portions 220A-220B and threaded into holes 219 formed in the hopper block 206 as shown in FIG. 2C. The hopper block 206 may include a hollow portion 217 configured to slide onto the barrel section 210C. The hopper block 206 may be mounted onto the entrance section 210C of the barrel 210 such that the opening 216 of the hopper block 206 is aligned with the inlet 226 of the entrance section 210C of the barrel 210 to provide a pathway for material to enter the barrel 210 from the hopper block 206. The screw 202 may be placed inside the barrel 210 and the screw flights may extend from the entrance section 210C of the barrel 210 to the main section 210A of the barrel 210 to facilitate pumping of the material from the inlet 226 of the barrel 210 toward the nozzle 208.

The static heat conduction may facilitate an automated machine start for the molding system 200, 300. The traditional injection molding machine 100 requires a purging process at start-up to generate shear heat sufficient to achieve plastic viscosity before molding. More details are disclosed in related U.S. Patent Application No. 62/087,480, entitled "Control System for Extrude-to-Fill Injection Molding," in related U.S. patent application Ser. No. 14/960,101, entitled "Control System for Injection Molding", filed on Dec. 4, 2015, and in related International Patent Application Number PCT/US2015/064073, entitled "Control System for Injection Molding", filed on Dec. 4, 2015, which applications are incorporated herein by reference in their entirety.

Raw material, such as plastic, may be provided in pellet form. The pellets may be approximately ⅛" to 3/16" in diameter and length, and irregularities in shape and size are common. To accommodate the pellets, traditional injection molding systems have a hopper with a throat of a certain size to accept the pellets, and the extrusion screw may be sized in both diameter and screw pitch to receive the pellets from the throat of the hopper and efficiently pull the pellets into the extrusion barrel. The need for accepting pellets may determine a minimum size of the screw and the barrel for the traditional injection molding system 100, which may determine the constant screw and barrel size throughout the traditional injection molding system 100.

The molding system 200, 300 may allow for dynamic packing and holding of a desired pressure in a mold cavity. Generally, as molten material in the mold begins to cool, it may shrink, resulting in a part with reduced mass and/or inconsistent or non-uniform density. The molding system 200, 300 may monitor a parameter indicative of a pressure in the mold cavity via, for example, one or more sensors associated with the mold, the molding system, and/or the clamp system. For example, the molding system 200, 300 may receive real time feedback from one or more sensors (such as a mold cavity pressure sensor, a screw back-pressure sensor, a frame strain gage, or other sensor) and may determine a real-time pressure in the mold cavity based on the output of the one or more sensors. If the molding system 200, 300 detects a drop in pressure in the mold cavity, the molding system 200, 300 may pump additional molten material into the mold cavity to maintain the desired pressure in the mold cavity, thereby offsetting shrinkage and/or mass reduction of the molded part to ensure a more consistent and/or uniform part density throughout the molded part.

The molding system 200, 300 may maintain the nozzle 208, 308 in an open configuration during the repacking process, or the molding system 200, 300 may selectively open and close the nozzle 208, 308 during the repacking process to permit or restrict, respectively, flow of molten material into the mold cavity. For example, the molding system 200, 300 may reverse rotation directions of the screw 202, 302 to move the screw 202, 302 in an axial direction relative to the nozzle 208, 308 to selectively open and close the nozzle 208, 308 with the screw tip 212, 312. When the nozzle 208, 308 is in an open configuration, the screw 202, 302 may be selectively rotated to maintain a substantially constant pressure in the mold cavity. The screw 202, 302 may be rotated to pump additional molten material into the mold cavity until the desired pressure in the mold cavity is reached. The desired pressure in the mold cavity may be determined by the mold or part designer, and may be based on a desired material density of the molded part.

The molding system 200, 300 may selectively pack the mold to a desired part density, and then maintain that part density during cooling of the material within the mold cavity due at least in part to the elimination of a cold slug, thereby allowing free flow of material for on-demand extrusion. In contrast, the traditional injection molding system 100 is a fixed, sequential process culminating with a single injection thrust, requiring a recovery stage in preparation for another injection cycle. Termination of the injection cycle of the traditional injection molding system 100 results in the formation of a cold slug in a nozzle opening, thereby preventing repacking. Shot size modifications for the traditional injection molding system 100 requires changes to the control settings prior to the injection cycle. By packing the mold to a desired part density, and then maintaining that part density during cooling of the material within the mold cavity, the density of the molded part may be consistently repeated, thereby providing a higher level of dimensional stability and strength of the molded part. Additionally, or alternatively, thicker than recommended wall sections in the geometry of the molded part may be achieved relative to industry-recommended molded wall thicknesses, resulting in increased molded part strength.

Figure 5:
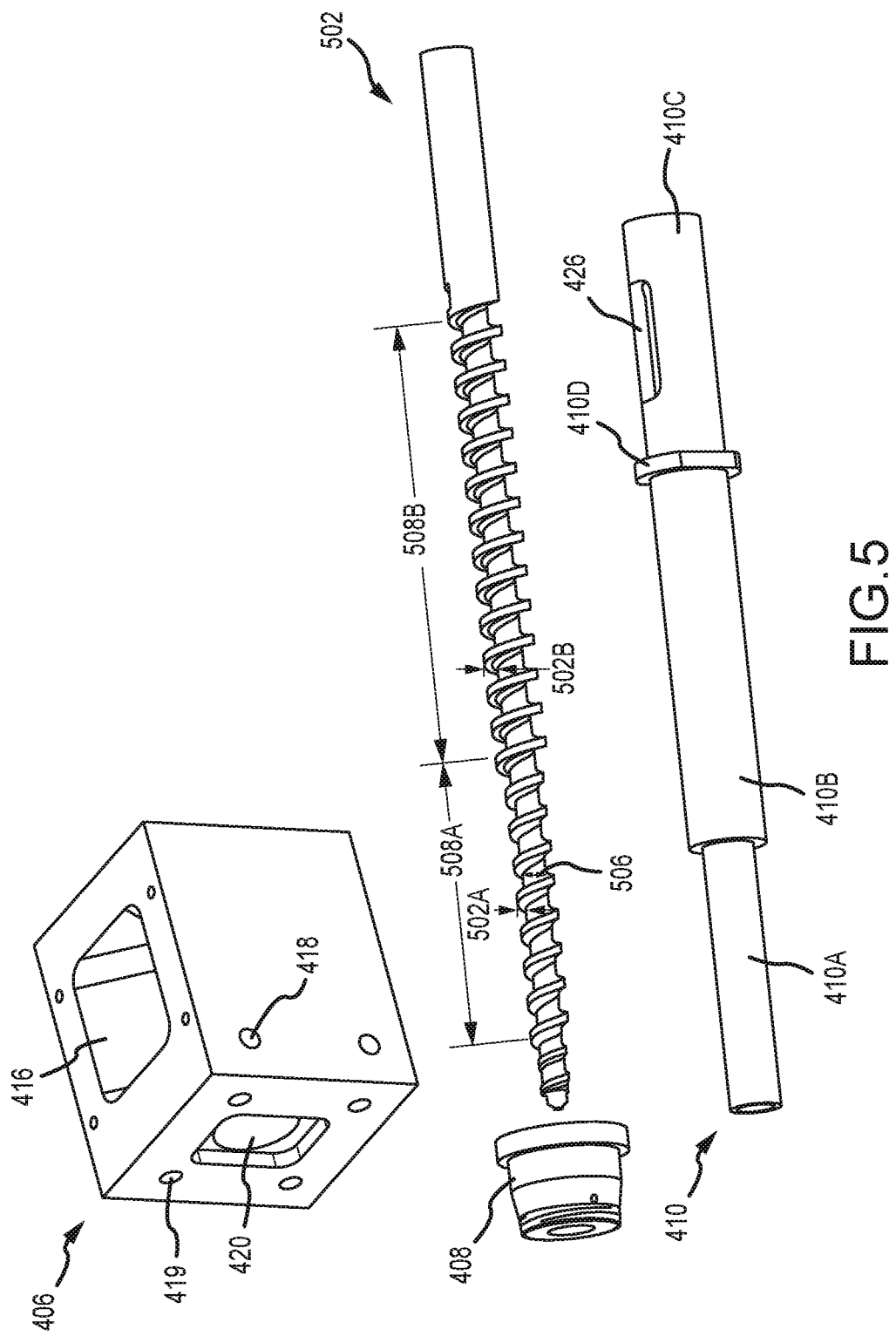
FIG. 5 is a perspective view of the molding system of FIG. 4A prior to assembly in accordance with embodiments of the present disclosure.

A stepped extrusion screw may be designed to accelerate material flow into the mold when faster fill speeds are desired. FIG. 4A illustrates a system 400 in accordance with embodiments of the present disclosure. FIG. 4B is a sectional view of the molding system 400 illustrated in FIG. 4A. FIG. 5 is a perspective view of the components of the molding system 400 illustrated in FIG. 4A prior to assembly.

Referring to FIGS. 4A-5, the molding system 400 may include a stepped extrusion screw 402. The inlet end of the stepped extrusion screw 402 may be of a sufficient size to receive pellets from the hopper 406, and the outer diameter of the screw 402 may be stepped down along the length of the screw 402 toward the outlet end of the screw 402, resulting in a corresponding reduction in the inner and outer diameter of the barrel 410. The stepped extrusion screw 402 and barrel 410 may enable the outlet or hot end of the apparatus 400 to fit in tighter or smaller areas, which may facilitate locating gates on the inside of certain molded parts so that the outside surface of the parts may be entirely decorative, with the gates hidden from view on the inside surface of the parts. In other words, by stepping down the outer diameter of the screw 402 and the inner and outer diameter of the barrel 410 as the material in the barrel 410 is elevated in temperature to melt the material, the reduced diameter of the screw 402 and the barrel 410 provides a reduction in size of the outlet end of the molding system 400 that enables the use of the molding system 400 in otherwise prohibitively small areas.

With continued reference to FIGS. 4A-5, the stepped extrusion screw 402 and the barrel 410 may cause the molten material to accelerate out of the outlet or hot end of the molding system 400, because the material is forced into a smaller cross-sectional area that accelerates the flow rate of the material. The accelerated flow rate of material may aide in filling small and intricate mold configuration without significantly reduced nozzle opening or mold gate geometry and may reduce the stress induced on the material and reduce part deformation.

With continued reference to FIGS. 4A-5, the stepped extrusion screw 402 may be placed inside the barrel 410. The barrel 410 may include a first section 410A and a second section 410B having a larger diameter than the first section 410A. A nozzle 408 may be coupled to an end of the first section 410A for delivering molten material into a mold. The barrel 410 may include an end section 410C with an opening 426 to receive raw material from a hopper block 406. The barrel 410 may include a barrel collar 410D that functions as a stopper when the hopper block 406 is assembled with the barrel 410.

The hopper block 406 may be coupled to the end section 410C of the barrel 410. The hopper block 406 may include a top opening 416 with a sloped side wall for a material to feed into the barrel 410 through an inlet 426 defined in the end section 410C. The hopper block 406 may include a hollow cylindrical portion 420 to slide onto the end barrel section 410C, and the hopper block 406 may be placed against a barrel collar 410D, which may be attached to the hopper block 406, for example, using fasteners inserted into holes 419 formed in the hopper block 406. The hopper block 406 may be cooled by circulating a cooling fluid, for example, circulating water or other cooling compounds, through channels 418.

As shown in FIG. 5, the stepped extrusion screw 502 may have a constant root diameter 506, and may include a first section 508A with a first flight height 502A, and a second section 508B with a second flight height 502B. For example, the stepped extrusion screw 502 may include a first screw section 508A of a smaller flight height 502A along the length of the screw 502 when, the raw material is heated and molten. The change from larger flight height to smaller flight height may increase the material flow into the mold, such that the pumping efficiency increases. The stepped extrusion screw 502 may include a second section 508B of a larger flight height 502B near the hopper where a raw material is drawn into the barrel. The larger flight height 502B of the screw may be efficient in feeding the material into the barrel from the hopper, such that the material is more easily fed into the barrel.

Figure 6A:
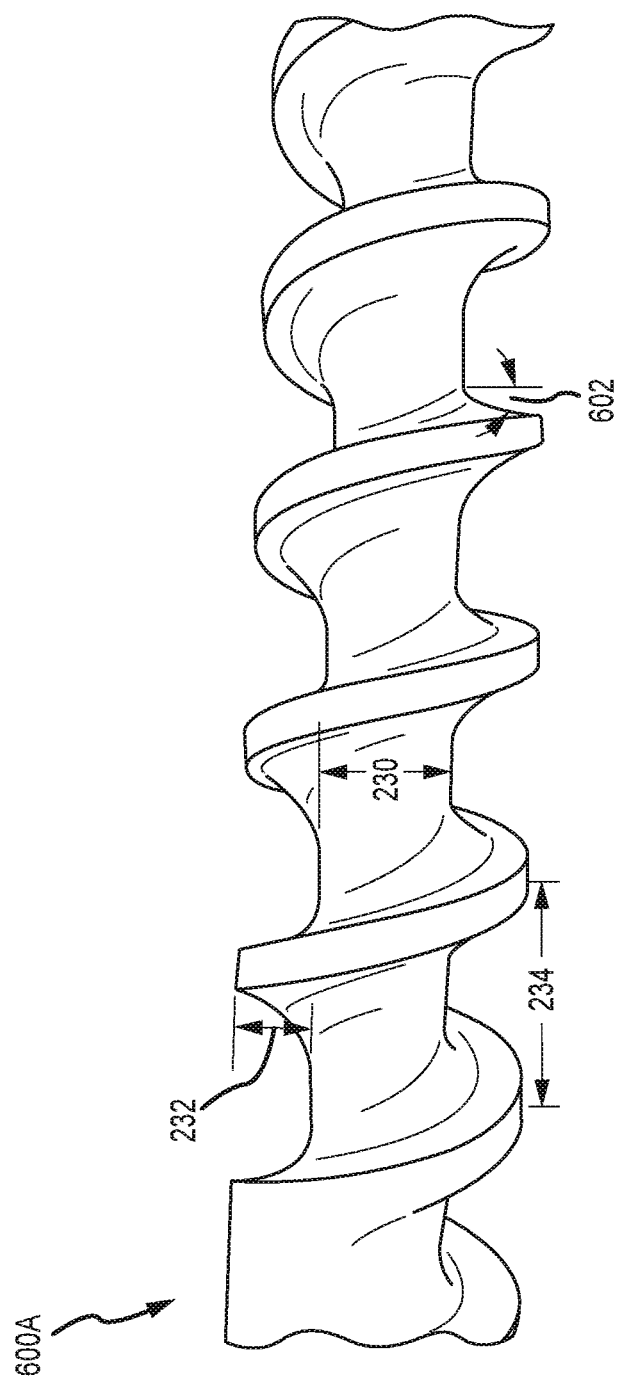
FIG. 6A illustrates an extrusion screw having a sharp geometry in accordance with embodiments of the present disclosure.

The pumping efficiency may vary with screw shape or geometry. For example, a screw 600A may include a flight or thread with substantially vertical side walls, and the screw 600A may be referred to as a sharp screw. The side walls of the flight of the screw 600A may extend away from a root of the screw 600A at a relatively small angle 602 as shown in FIG. 6A. The relatively small am-Ile 602 may make it easier to feed the material into the barrel from the hopper, such as flake-type samples. Referring to FIG. 6B, a screw 600B may include a flight or thread with less-vertical side walls than the flight of the screw 600A in FIG. 6A, and the screw 600B may be referred to as a less sharp screw. The side walls of the flight of the screw 600B may extend away from a root of the screw 600B at a relatively large angle 604 that is greater than angle 602 of screw 600A. The relatively large angle 604 of the screw 600B may provide good mixing of the material, including cold and hot material. A screw may include a first portion of the less sharp geometry as shown in FIG. 6B near the nozzle and a second portion of the sharp geometry as shown in FIG. 6A near the hopper (not shown). In some embodiments, screw flights positioned near the hopper may be more vertical (e.g., more perpendicular relative to a root diameter) than screw flights positioned near the nozzle. For example, the extrusion screw may have a more vertical flight geometry near the hopper to receive pelletized material from the hopper and efficiently pull the pellets into the extrusion barrel, an angled shallower flight geometry in the temperature transition region to mix cold and hot material together, and another flight geometry change to mix and pump material along the final length of the screw toward the nozzle.

The screw may include varying pitches (e.g., multiple different pitches) along its length to provide different pumping and mixing characteristics along its length. For example, depending on the molding application, the screw may be designed with a relatively small pitch, a relatively large pitch, or a combination of pitches. The change in pitch along the length of the screw may be gradual or progressive, or abrupt. For example, the pitch of the screw flights may gradually change (e.g., increase) along the length of the screw from the hopper to the nozzle. Additionally, or alternatively, the screw may include multiple sections defined along its length, and the sections may have different pitches relative to one another. For example, the extrusion screw may have a larger screw pitch to receive pelletized material from the hopper and efficiently pull the pellets into the extrusion barrel, a smaller screw pitch to mix cold and hot material together, and an even smaller screw pitch to pump molten material along the length of the screw toward the nozzle. Referring to FIG. 5, the first section 508A of the screw 502 may include a first pitch between adjacent screw flights, and the second section 508B of the screw 502 may include a second pitch between adjacent screw flights that is different than the first pitch. In some embodiments, the second pitch of the second section 508g may be larger than the first pitch of the first section 508A, because the second section 508g may pump pelletized material from the hopper towards the nozzle and the first section 508A may pump molten material towards the nozzle.

Figure 7:
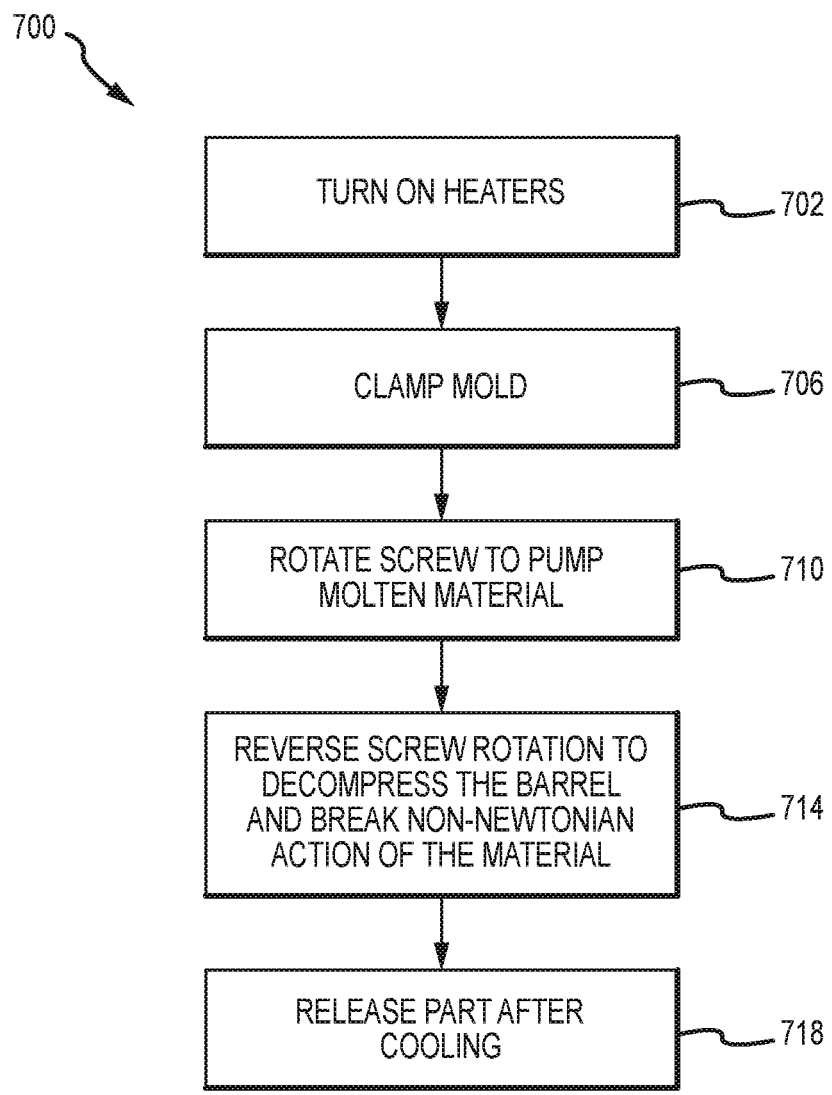
FIG. 7 is a flow chart illustrating steps for molding a part in accordance with embodiments of the present disclosure.

FIG. 7 is a flow chart illustrating steps for molding a part in accordance with embodiments of the present disclosure. Method 700 starts with turning on one or more heaters to melt a material inside a barrel at operation 702. The mold may be clamped by applying pressure at operation 706.

Method 700 may include removing support from behind the screw. Extrusion may begin with the initial rotation of the extrusion screw which may cause the screw to move axially relative to the barrel or the initial axial movement of the barrel relative to the screw to open the nozzle. Extrusion may continue with screw rotation to pump the molten material into a mold until the mold is filled at operation 710. During the pumping of the material into the mold, the extrusion screw may have no axial movement. After filling the mold cavity, there may be a holding time to hold extrusion pressure against the material in the mold. For example, the molding system 200, 300 may rotate the extrusion screw 202, 302 to apply a dynamic load on the material in the mold to maintain a desired part density. The screw 202, 302 may be moved axially relative to the barrel 210, 310 to selectively open and close the nozzle 208, 308 to permit or prevent, respectively, material from flowing into the mold cavity. As the material in the mold begins to cool, the molding system 200, 300 may open the nozzle 208, 308 and rotate the screw 202, 302 to repack the mold, thereby compensating for part shrinkage as the material in the mold cools. The ability to dynamically repack the mold is achievable, for example, due to the matched geometry of the screw tip 212, 312 and the nozzle 208, 308 preventing the creation of a cold slug and the on-demand extrusion capability of the molding system 200, 300. By maintaining a desired pressure on the material in the mold, the molding system 200, 300 may assure consistent part density and may eliminate common defects experienced with the traditional injection molding system 100, such as part shrinkage and surface sink marks.

Method 700 may further include reversing rotation of the extrusion screw to decompress the barrel and to break the non-Newtonian action of the material at operation 714. The reversal decompression cycle may break pressure build-up in the barrel. The decompression cycle may eliminate any hysteresis, and may reset the molding system to a low motor torque requirement at an extrusion start. The decompression cycle may relieve the strain in any component of the machine frame. The non-Newtonian action of the material may cause the material to absorb direct force and push outward against the barrel wall, which may increase the force required to move the material in its intended path. The non-Newtonian action may be broken by reversing rotation of the extrusion screw, which may allow continuous extrusion of material under a low injection pressure, which may be about 500 psi to about 1,500 psi.

Method 700 may also include unclamping the mold by releasing the pressure at operation 718. Then, a molded part may be removed from the mold. For each molding cycle, the extrusion screw may rotate to move backward relative to the barrel or the barrel may move forward relative to the screw to open the nozzle and to move plastic forward to fill the mold. Then, the screw may reverse the rotation to move forward relative to the barrel or the barrel may move rearward relative to the screw to close the nozzle.

The molding operation described above is different from the operation of the traditional injection molding system 100 (see FIG. 1). The present molding system does not include a recovery extrusion stage and an injection cycle like the traditional injection molding system 100. Referring to FIG. 1 again, the traditional molding process begins with rotating the extrusion screw 102 to churn plastic to generate shear heat while transferring plastic to the front end of the screw 102. During the recovery extrusion stage, the plastic is moved forward and the extrusion screw 102 is allowed to move backward for a pre-selected distance, which affects the shot size in addition to screw diameter. An injection cycle starts after the recovery extrusion stage. A large force is applied to the back of the extrusion screw 102 by an injection cylinder 138 to advance the extrusion screw 102, which dislodges the cold slug and evacuates the plastic in the injection zone 112.

Low Pressure Molding Operation

The molding system 200, 300, 400 may operate with much lower injection forces than the traditional injection molding system 100. For example, the molding system 200, 300, 400 may generate the same pressure as the pressure in the mold cavity or slightly higher injection pressure, such as 5-10% higher injection pressure, than the pressure in the mold cavity, which may range from 500 to 1,500 psi, for example. In contrast, an injection pressure of 20,000 psi to 30,000 psi may be required for the traditional injection molding system 100 to provide the same pressure of 500 to 1,500 psi to the mold cavity. As a result of the lower injection pressure, the total power requirement for the molding system may be, for example, 0.5 to 3 kilowatt hours of 110 volts or 208 volts of single phase electrical supply. In contrast, the traditional injection molding system 100 requires 6 to 12 kilowatt hours of 220 volt or 440 volt three phase electrical supply.

The low injection pressure may reduce the required clamping pressure for the mold. For example, the clamping pressure may be about 10% higher than the pressure required in the mold cavity. As a result of the low clamping pressure, molds may be formed of a lower cost material, such as aluminum, instead of steel for traditional molds. The low injection and clamping pressure may reduce the machine size, which may reduce machine cost and operating costs. The molding system may be much smaller than the traditional injection molding system 100. Additionally, the extrusion under a lower pressure may result in more uniformly molded parts with consistent density, which may reduce part warping and improve product quality. The molding system may include a low pressure clamping system for the mold, which may reduce damage to the tooling due to high clamping pressure from the traditional injection molding system.

In some embodiments, the molding machine may include a clamp system including a front access or shuttle table (hereinafter "shuttle table" for the sake of convenience without intent to limit). The shuttle table may be used in associated with a vertical clamp structure, and may facilitate operator access to a bottom half of a mold. The shuttle table may facilitate operator access to the mold outside of a clamp area, which may provide advantages when insert molding and overmolding. The shuttle table may move along an axial direction of the molding machine, in contrast to a lateral movement of shuttle tables of traditional injection molding systems. The shuttle table may provide an operator an open-ended amount of time to inspect a molded part, reload a mold with multiple inserts, remove a part, or other functions.

The shuttle table may provide one or more advantages over the side-to-side shuttle table commonly used on traditional injection molding systems. The side-to-side shuttle table used on the traditional injection molding systems requires the manufacture of two independent bottom mold halves. Once the cycle completes and a first bottom mold half is filled, the clamp press opens and the side-to-side shuttle table moves in a lateral direction to remove the first bottom mold half from the press area and to pull a second bottom mold half into the clamp area on a common shuttle bed from the opposing lateral direction. This side-to-side motion of the shuttle table requires the operator (or automated pick and place equipment) to move side-to-side around the machine to unload the finished part and reload the respective first or second bottom mold half to prepare for the next injection cycle. This lateral movement is required due to the need of the traditional injection molding system to continuously operate on a fixed sequence cycle to prepare material using frictional pressure.

The front access shuttle table may allow an operator to access the mold with greater ease, flexibility, safety, and/or visibility. Referring to FIGS. 8A and 8B, the molding machine 800 may include a molding system 801 (such as molding system 200, 300, 400 illustrated in FIGS. 2A-4B) and a vertical clamp system 802. The clamp system 802 may include a shuttle table 803 that may be extracted from a clamp area 804 of the vertical clamp system 802 and may be reinserted back into the clamp area 804 dictated by, for example, the needs and pace of the part being molded (such as insert- or over-molded) and not dictated by material processing (melting) requirements of the molding machine 800. An operator work station and operator activities may occupy less space and be conducted in a safer manner because, for example, the operator may remain at one station and interface with the mold while the machine remains in an idle state. The shuttle table 803 may support a single bottom mold half, and therefore may accommodate reduced capital expenditure in tooling cost and automated pick and place equipment.

Referring still to FIGS. 8A and 8B, the shuttle table 803 may be accessible at an axial end of the molding system 800 and may slide along an axial direction of the molding machine 800. The shuttle table 803 may be slidable between a retracted position where the shuttle table 803 is substantially positioned in the clamp area 804 (see FIG. 8A), and an extended position where the shuttle table 803 is substantially removed from the clamp area 804 (see FIG. 8B). When in the retracted position, the shuttle table 803 may position a lower mold half 808 in the clamp area 804 for mating with an upper mold half 810 to define a mold cavity for receiving molten material from nozzle 822 (such as nozzle 208, 308, 408 in FIGS. 2A-4B). As illustrated in FIG. 8A, when in the retracted position, the shuttle table 803 may position the lower mold half 808 into engagement with the nozzle 822 of the molding system 801. When in the extended position, the shuttle table 803 may remove the lower mold half 808 from the clamp area 804 to provide an operator with access to the lower mold half 808. As illustrated in FIG. 8B, when in the extended position, the shuttle table 803 may separate the lower mold half 808 from the nozzle 822 of the molding system 801. As illustrated in FIGS. 8A and 8B, the nozzle 822 may be coupled to barrel 824 (such as barrel 210, 310, 410 in FIGS. 2A-4B) of molding system 801.

With continued reference to FIGS. 8A and 8B, the shuttle table 803 may be movable along a longitudinal axis 815 of the molding system 801, such as the barrel 824. The shuttle table 803 may be slidably coupled to a substantially-horizontal platen 812 of the molding machine 800 for movement along the longitudinal axis 815. The shuttle table 803 may be slidably mounted onto a shuttle base 814, which may be fixedly attached to the platen 812. The shuttle base 814 may restrict the shuttle table 803 from moving laterally relative to the platen 812, and may function as a track to guide the shuttle table 803 along the longitudinal axis 815. Movement of the shuttle table 803 may be controlled by an operator of the molding machine 800. For example, the molding machine 800 may include a control interface (such as a button) that controls movement of the shuttle table 803. The control interface may allow the operator to slide the shuttle table 803 into the clamp area 804 for molding a part or out of the clamp area 804 for access to the lower mold half 808 and/or or part received therein.

The shuttle table 803 may include a substantially flat upper surface 816 for supporting the lower mold half 808. The upper surface 816 may be sized to support mold halves of different sizes, and may be positioned between vertical tie bars 818 of the molding machine 800. The upper mold half 810 may be attached to a substantially-horizontal platen 820 of the molding machine 800. The upper platen 820 may be movable in a vertical direction along the tie bars 818 toward and away from the lower platen 818 to mate and separate, respectively, the upper and lower mold halves 808, 810.

With further reference to FIGS. 8A and 8B, to mold a part the movable platen 820 may be moved along the vertical tie bars 818 until the upper mold half 810 engages the lower mold half 808. A sufficient clamp pressure may be applied to the mold halves 808, 810 to seal the interface between the mold halves 808, 810. Once the mold halves 808, 810 are sufficiently engaged with each other, the molding system 801 may extrude molten material into a mold cavity defined by the mold halves 808, 810 until the mold cavity is filled. The molding machine 800 may monitor a parameter indicative of a pressure in the mold cavity (such as by a pressure transducer placed inside the mold cavity, a pressure transducer placed inside the barrel of the molding system 801, a torque sensor measuring a screw torque of the molding system 801, a strain gage measuring a strain of a frame of the molding machine 800, or other pressure indicative parameter), and may extrude additional material into the mold cavity if a loss in pressure is detected to maintain a desired pressure in the cavity and obtain a desired part density. The desired pressure may be determined based on various molding characteristics such as a part density recommended by the part designer), and the desired pressure may include a range of acceptable pressures. After a desired pressure has been maintained in the mold cavity for a predetermined time to allow the molten material in the mold cavity to sufficiently cool, a nozzle (for example nozzle 208, 308, 408 in FIGS. 2A-4B) may be closed (for example by screw tip 212, 312 in FIGS. 2A-3C) and the upper platen 820 may be moved in a vertical direction along the tie bars 818 to separate the upper and lower mold halves 808, 810. During or after separation of the mold halves 808, 810, the shuttle table 803 may be slid along the axial direction 815 of the molding system 801 to move the lower mold half 808 away from the clamp area 804 to provide access to an operator to inspect a molded part remaining in the mold cavity of the lower mold half 808. The shuttle table 803 may be slid along a substantially horizontal axis 815 from a molding position adjacent an end of the barrel 824 (for example barrel 210, 310, 410 in FIGS. 2A-4B) to an access position spaced axially from the end of the barrel 824.

The higher degree of injection force control, mold design flexibility, and machine design flexibility allows a wider range of possibilities for production of injection molding of discreet plastic parts and insert molded parts where discreet components or assemblies are placed into the injection mold to have plastic added to them in the molding process.

In some embodiments, a single molding machine may include multiple LIT molding systems (such as molding system 200, 300, 400 in FIGS. 2A-4B), which may fill a mold of multiple cavities (e.g., multiple similar or dissimilar cavities) or a large mold cavity from multiple gates. The number of molding systems that may be included in a single molding configuration or machine may be unlimited. The positioning of the molding systems is not limited to a common plane or traditional position, and each molding system may be mounted, hung, suspended, etc. to accommodate specific gating requirements of a part or mold. The molding systems may be of similar or dissimilar size and screw design to accommodate the mold or material demands for their respective output. The molding systems may be connected to a common material source, sub-groups of material source, or independent material sources to accommodate the mold demands for their respective output. The molding systems may be controlled as a common group, sub-groups, or independently to perform their respective functions and accommodate the mold demands for their respective output. The molding systems may be coordinated as a group, sub-groups, or independently to synchronize machine functions controlled by a central or main microprocessor. The molding systems may have a similar or dissimilar heating and insulating configuration to accommodate mold or material demands for their respective output. The molding systems may have similar or dissimilar output feedback methods and sources to accommodate the mold demands for their respective outputs.

Figure 9:
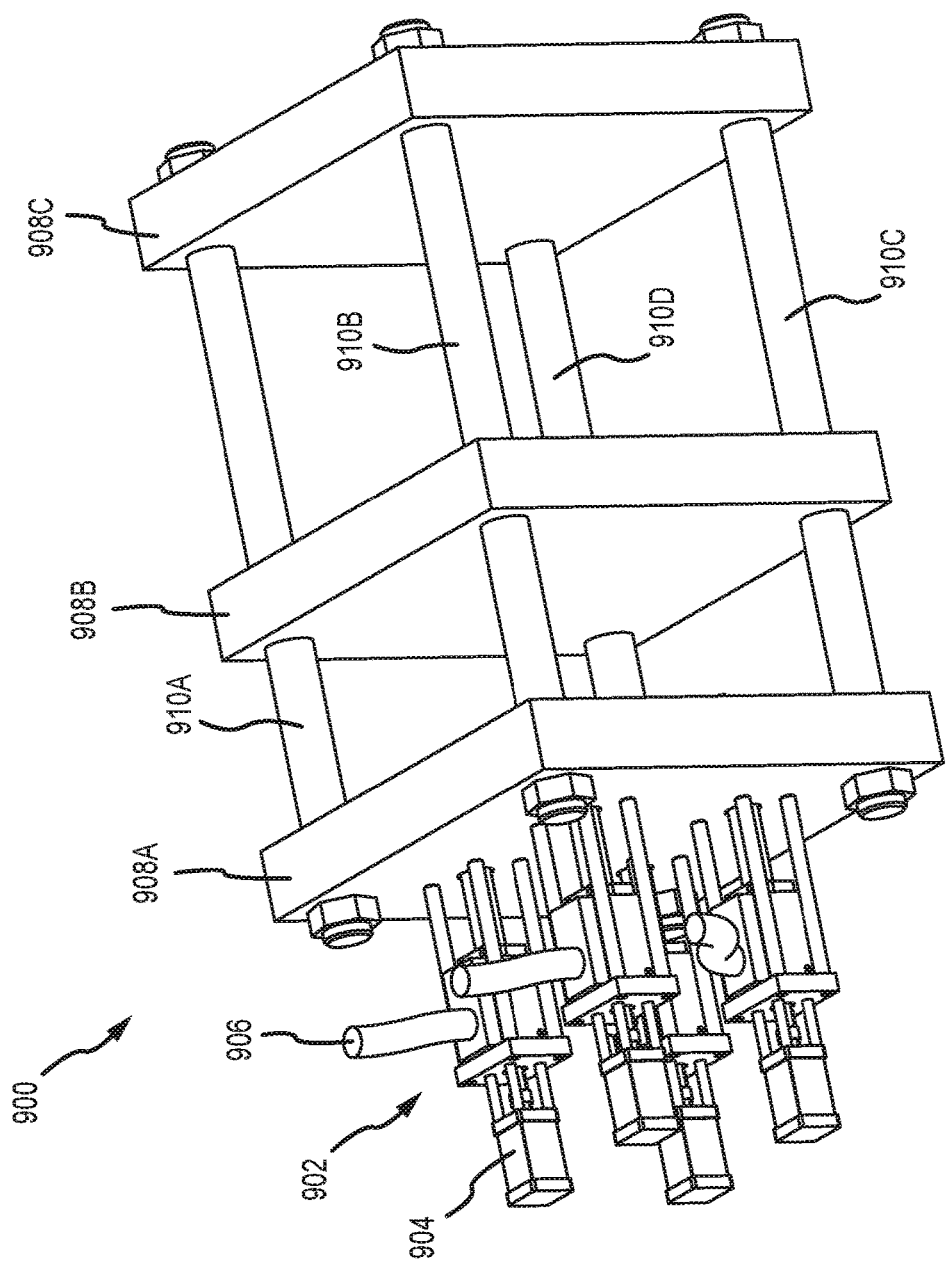
FIG. 9 is a simplified diagram illustrating a molding machine including multiple molding systems in accordance with embodiments of the present disclosure.

FIG. 9 is a simplified diagram illustrating a molding machine 900 including multiple molding systems 902 in accordance with embodiments of the present disclosure. Molding system 900 may include four separate molding systems 902 (hereinafter "extruders" for the sake of convenience without intent to limit), each of which may include subassemblies 904 (each of which may include a controller for the respective extruder 9021) and corresponding inlets 906 connected to one or more hoppers to receive materials from the hoppers. The extruders 902 may be fed by gravity, vacuum, auger, or other means to the individual feed tubes or inlets 906. In some embodiments, the inlets 906 may be connected to a single, common hopper. For example, a single hopper may accept material, such as plastic pellets, and may use a series of feed tubes or inlets to transport the plastic pellets to the individual extruders 902 to allow their independent function within the machine 900. In some embodiments, the inlets 906 may be connected to a series of independent hoppers, and materials of common nature but different colors, or materials of different nature, may be molded in a common machine cycle. Parts of differing size and material type may be accommodated in a common cycle due to the extruders 902 each functioning and being controlled independent of one another. Each extruder 902 may be operated independently but coordinated to assure efficient molding as a coordinated system.

Figure 12:
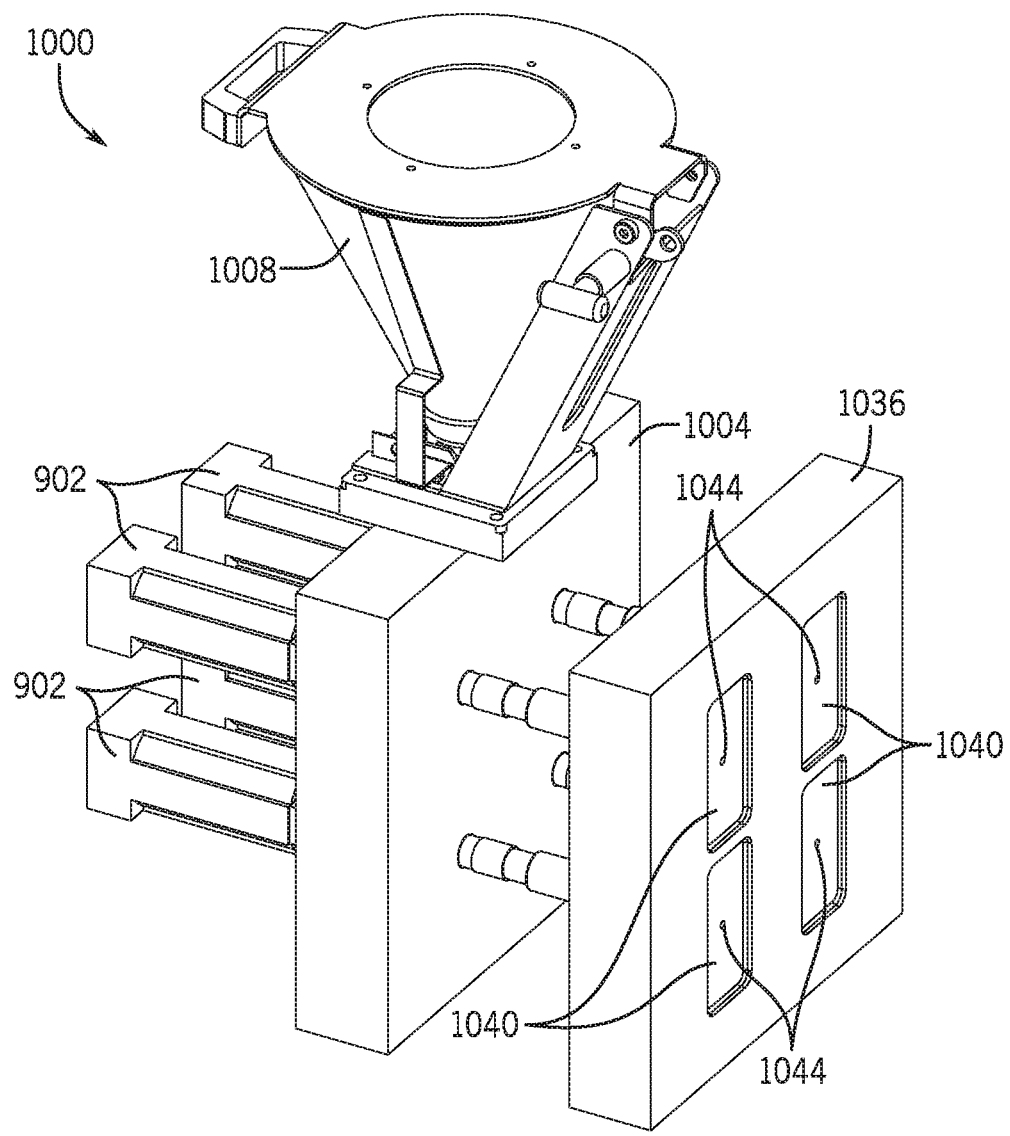
FIG. 12 is a perspective view of the multiple molding systems of FIG. 10 coupled with a mold half defining multiple mold cavities in accordance with embodiments of the present disclosure.
Figure 13:
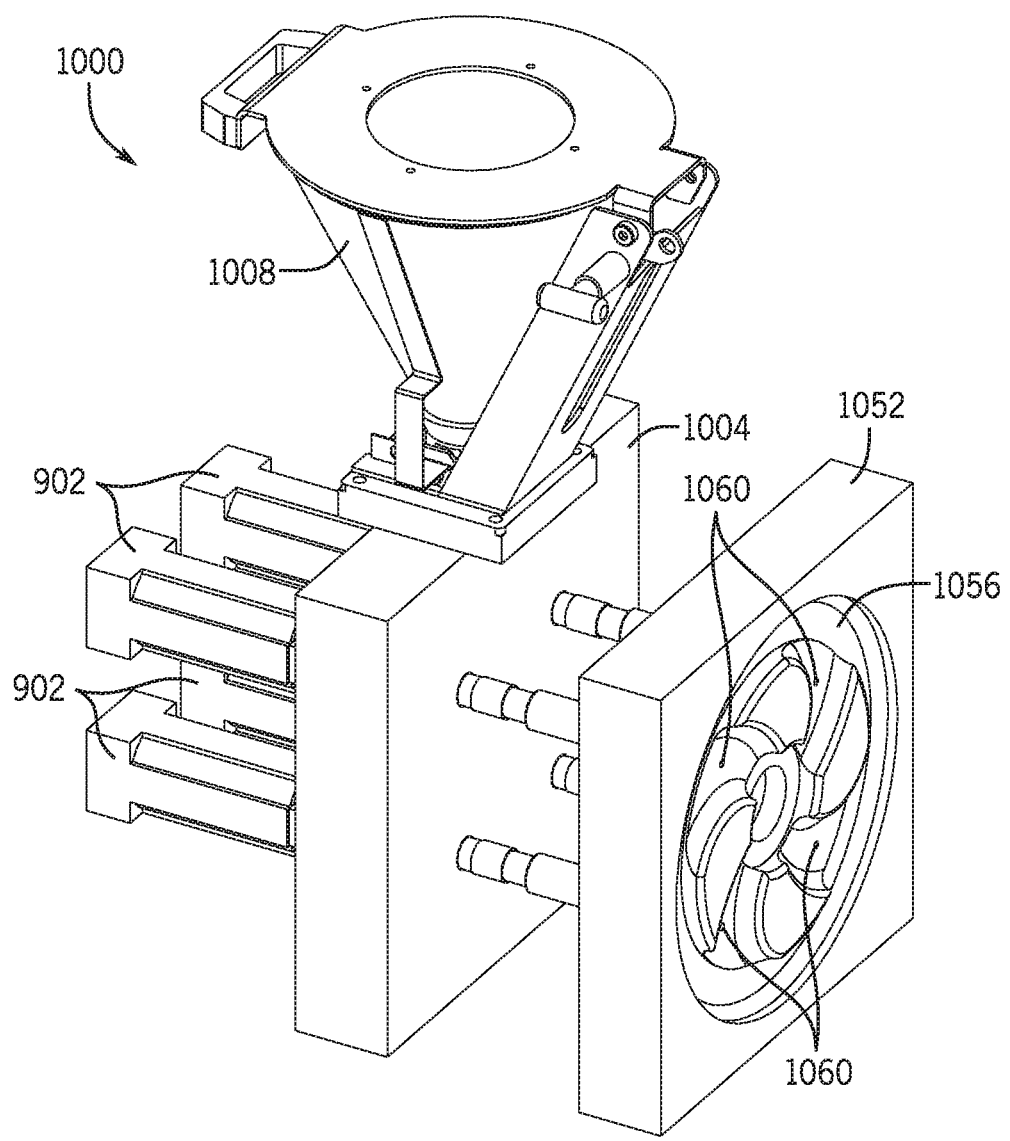
FIG. 13 is a perspective view of the multiple molding systems of FIG. 10 coupled with a mold half defining a single mold cavity in accordance with embodiments of the present disclosure.

Referring to FIG. 9, a single molding machine 900 may include multiple extruders 902 to fill a mold with a plurality of cavities see, e.g., FIG. 12) or a single cavity (see, e.g., FIG. 13). The extruders 902 may extrude the same or different materials. The individual extruders 902 may be coupled to a single mold having multiple gates (see, e.g., FIG. 13) to fill a portion of the mold. The combination may be desirable because, for example, the resin material in the extruders 902 may be prepared for molding with the extruders 902 in a static state. Each extruder 902 may be controlled independently. Each extruder 902 may provide individual feedback to its respective controller. Each extruder 902 may include pressure sensing from a direct pressure sensor, a torque load on a motor coupled to the respective injection system, an amount of electricity consumed by the respective motor, a strain gale on a frame of the molding system, or other pressure sensing parameters. Each extruder 902 may be arranged as a closed loop system and may be controlled individually. A central or main microprocessor may process data received from the extruders 902 and control each extruder 902 to individually or collectively cease material flow once a targeted pressure is achieved. A central or main microprocessor may process data received from the individual extruders 902 to sequentially, simultaneously, or otherwise activate individual extruders 902 to provide progressive function. The extrusion molding system 900 may be a closed loop system that features a sensor-defined, output-based process that allows use of any combination of extruders 902. The combined systems may allow for molding large parts with consistent part density, which may lead to accurate and consistent dimensions for molded parts, and may reduce warping plastic parts. The molding system 900 may be more efficient than the traditional injection molding system 100, which delivers plastic from a single nozzle, through multiple runner branches, each branch causing a pressure loss that requires a much higher initial injection force. The high injection force of the traditional injection molding system 100 requires more power and a more massive machine with higher operating costs while providing non-uniform plastic temperature and viscosity.

Referring to FIG. 9, a single molding machine 900 may produce individual molded parts, of similar or dissimilar geometry, material type, or color, from two or more mold cavities utilizing two or more independently operating extruders 902 individually aligned to each independent cavity within the mold. Each extruder 902 may be controlled independently. When used for parts of common geometry and material type, each extruder 902 may provide individual feedback to its respective controller to ensure uniformity in each cavity of the mold and provide accurate part density and product quality. When used for parts of dissimilar geometry or material type, each extruder 902 may provide individual feedback to its respective controller to ensure achievement of different requirements for each independent mold cavity. Each extruder 902 may have pressure sensing from a direct pressure sensor, a torque load on a motor coupled to the respective injection system, an amount of electricity consumed by the respective motor, or other pressure sensing parameters. Each extruder 902 may be arranged as a closed loop system for each respective mold cavity, collecting data from and related to the individual mold cavity, and may be controlled individually. A central or main microprocessor may process data received from the injection systems 902, and may individually cease material flow and collectively open and close the mold based on the data received from the individual injection systems 902.

The molding machine 900 may be a highly efficient, compact, and self-contained assembly that fits into a small footprint allowing the individual extruders 902 to be used in close proximity to one another. The molding machine 900 may be a closed loop system that features a sensor-defined, output-based process that allows use of any combination of extruders 902. The combined extruders 902 may allow for molding individual parts with consistent part density and uniform weight, which may lead to accurate and consistent dimensions for individual but common molded parts, and may improve performance when used in highly automated assembly operations. The extruders 902 may allow for molding disparate parts with differing material, density, and weight requirements, which may be discrete items or may be used in common assemblies to improve the efficiency of assembly operations or reduce part cost by amortizing tooling cost across multiple dissimilar parts. The molding machine 900 may be inure efficient than the traditional injection molding system 100, which delivers plastic from a single nozzle, through multiple runner branches, each branch causing a pressure loss that requires a much higher initial injection force. The high injection force of the traditional injection molding system 100 requires more power and a more massive machine with higher operating costs while providing non-uniform material temperature and viscosity resulting in inconsistent individual part uniformity.

Molding machine 900 may include a frame including vertical platens 908A-908C and horizontal bars 910A-910D at four corners of each platen 908A-908C. The platens 908A-908C may be connected by the horizontal bars 910A-910D passing through holes in the platens 908A-908C. The vertical platens 908A-908C may be substantially parallel to each other and may be spaced along the horizontal bars 910A-910D, which may be substantially parallel to each other. A mold may be placed between platens 908A and 908B. The position of platen 908B may be adjustable along the bars 910A-910D, to accommodate a mold of a particular size. The frame may be assembled by fastening the bars 910A-9101) against the platens 908A and 908C on two opposite ends of the bars 910A-910D.

Figure 10:
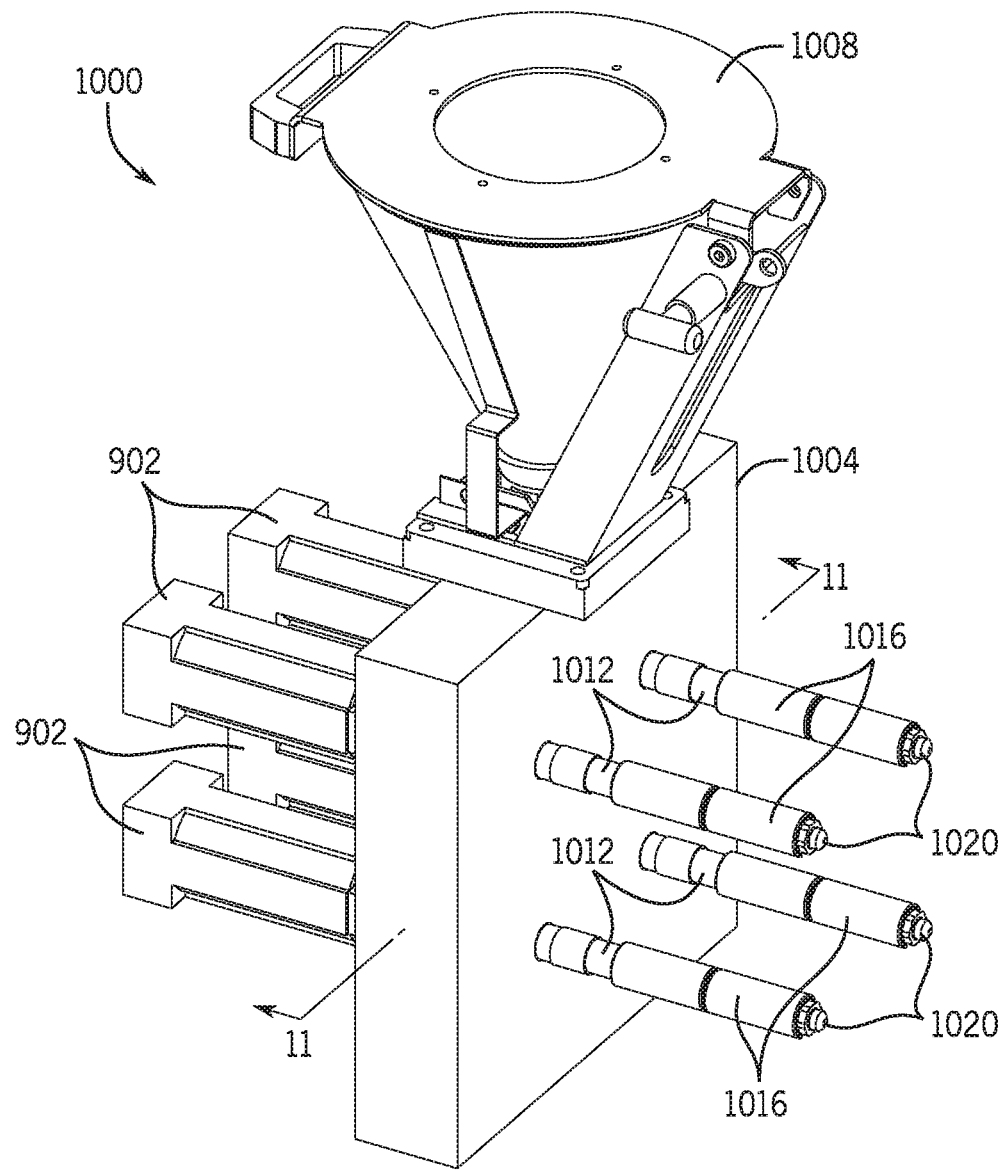
FIG. 10 is a perspective view of a molding machine including multiple molding systems in accordance with embodiments of the present disclosure.

Referring to FIG. 10, a molding machine 1000 may include multiple extruders 902, coupled to a manifold 1004. The manifold 1004 may support the extruders 902 relative to one another and may be coupled to a hopper 1008. The hopper 1008 may be placed on top of the manifold 1004 to facilitate the distribution of molding material (such as cold pellets) to the individual extruders 902. Each extruder 902 may include an independent drive system (such as a motor) and independent controls to operate the respective extruder 902. Each extruder 902 may include a screw (such as screw 202, 302, 402, 502 in FIGS. 2A-5) rotatably positioned inside a barrel 1012 (such as barrel 210, 310, 410 in FIGS. 2A-5). Each extruder 902 may include one or more heaters, which may include external heaters 1016 (such band heaters 214 in FIGS. 2A-2C and/or inductive heating coil 340 in FIGS. 3A-3C) and/or internal heaters (such as resistive heater 225 in FIG. 2B and/or inserts 325 in FIGS. 3A-3C). Each extruder 902 may be coupled to the manifold 1004 via a thrust bearing housed in the manifold 1004. Each extruder 902 may include an independent valve gate nozzle 1020 (such as nozzle 208, 308, 408 in FIGS. 2A-4B) for controlling the flow of resin material, such as plastic, into a mold cavity associated with the nozzles 1020.

Figure 11:
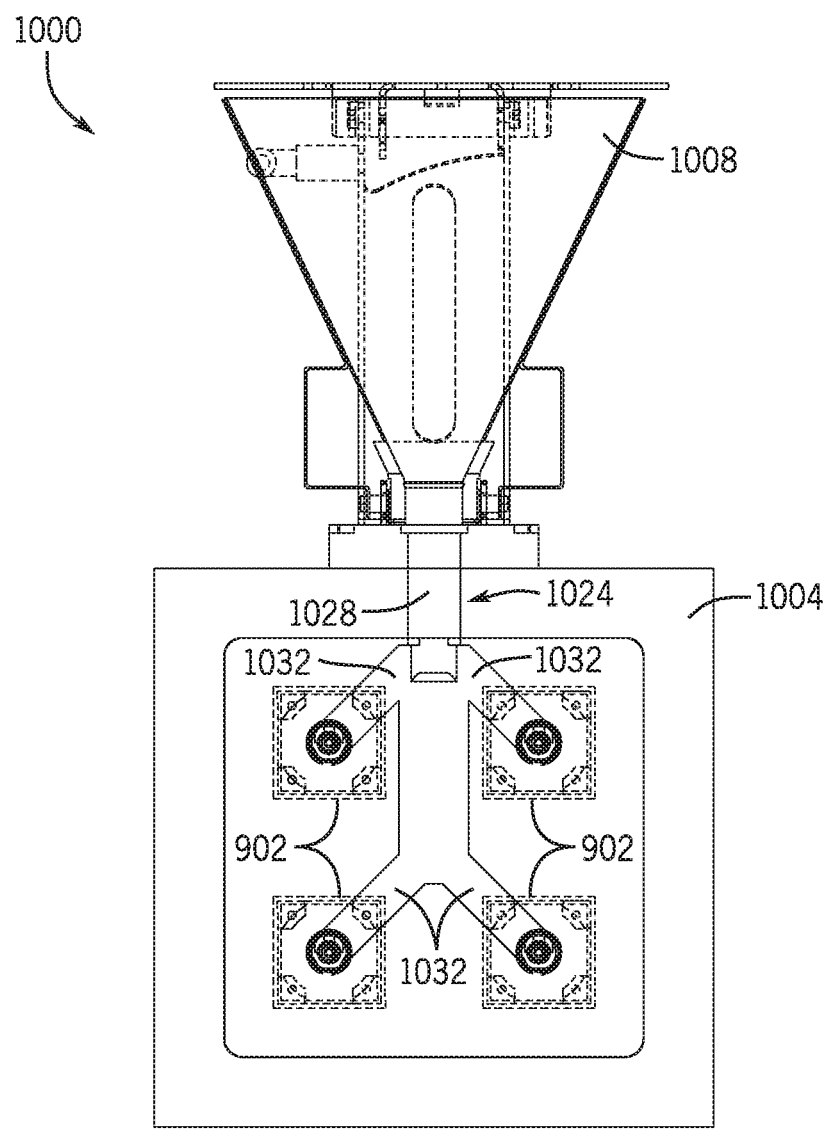
FIG. 11 is a sectional view of the molding machine of FIG. 10 taken along line 11-11 in Ha 10 and illustrates a flow path from a hopper to the multiple molding systems in accordance with embodiments of the present disclosure.

Referring to FIG. 11, raw material (such as cold plastic pellets) may be loaded into the hopper 1008. The raw material may flow through a flow path 1024 defined in the manifold 1004 from the hopper 1008 to the individual extruders 902. The raw material may enter the extruders 902 through inlet ports (such as barrel inlet 226 illustrated in FIGS. 2B and 2C). The raw material may be gravity fed from the hopper 1008, through the manifold 1004, and into each extruder 902. The flow path 1024 may include a single channel or throat 1028 extending downwardly from the hopper 1008 into an upper portion of the manifold 1004. The throat 1028 may split into one or more branches 1032, with each branch 1032 of the flow path 1024 being in fluid communication with a respective inlet port of an individual extruder 902. The flow path 1024 may include different arrangements depending on the arrangement and orientation of the extruders 902 relative to the manifold 1004. The extruders 902 may be oriented substantially parallel to each other and substantially perpendicular to the manifold 1004 as illustrated in FIGS. 10 and 11, or the extruders 902 may be oriented non-parallel to each other and/or non-perpendicular to the manifold 1004 depending on the configuration of an associated mold. The extruders 902 may be arranged in a matrix with the extruders 902 forming vertical columns and horizontal rows of extruders, or the extruders 902 may be arranged in a non-matrix arrangement depending on the configuration of an associated mold.

The extruders 902 may extrude material into the same cavity of a mold half or different mold cavities of a mold half. Referring to FIG. 12, the molding machine 1000 includes a mold half 1036 defining multiple mold cavities 1040. Each extruder 902 is in fluid communication with a different mold cavity 1040 of the mold half 1036 via a mold gate 1044. Each extruder 902 may receive raw material from the hopper 1008, melt the raw material, and then extrude the material into the respective mold cavities 1040, which may be similar to each other in geometry as illustrated in FIG. 12 or may be dissimilar in geometry. Each extruder 902 may include an independent controller monitoring the pressure in the respective mold cavity 1040, and the controller may cease extrusion from the respective extruder 902 once a desired pressure is reached in the respective mold cavity 1040. After all cavities 1040 in the mold half 1036 reach their desired pressures, a main controller may release a clamp pressure applied to the respective mold halves and may separate the mold halves to release the molded parts.

Referring to FIG. 13, the molding machine 1000 includes a mold half 1052 defining a single mold cavity 1056. Each extruder 902 is in fluid communication with the same mold cavity 1056 of the mold half 1052 via separate mold gates 1060. Each extruder 902 may receive raw material from the hopper 1008, melt the raw material, and then extrude the material into the same mold cavity 1056. Each extruder 902 may include an independent controller monitoring the pressure in the area surrounding the mold gate 1060 of the respective extruder 902, and the controller may cease extrusion from the respective extruder 902 once a desired pressure is reached in the respective portion of the mold cavity 1056. After all extruders 902 reach their desired pressures, a main controller may release a clamp pressure applied to the respective mold halves and may separate the mold halves to release the molded parts. In some embodiments, a main controller may control the independent extruders 902 based on one or more pressures associated with the mold cavity 1056. The extruders 902 may work together to fill the mold cavity 1056 and may attain a more consistent part density providing greater dimensional stability.

Molding Materials

The static heat generation and conduction used in the molding system may be insensitive to resin materials or properties, including, but not limited to, resin grade, purity, uniformity, and melt flow index among others. For example, the molding system may be capable of molding any thermoplastic materials, such as co-mingled/mixed post-consumer recycled plastics, a mixture of resins with different melt flow indexes, coming from different plastic classifications or chemical families, bio-based materials each of which are difficult to mold with the traditional injection molding system. In a further example, a mixture including two or more different resin pellets may be mixed to mold a part. Multiple plastics may have different processing characteristics, such as melt flow index, melting temperature, or glass transition temperature but the co-mingling of these materials may not present any issues to the molding system. The recycled plastics may include, but are not limited to, polyethylene (PE), high density polyethylene (HDPE), low density polyethylene (LDPE), polypropylene (PP), polyethylene terephthalate (PET), nylon (PA), polycarbonate (PC), polylactic acid (PLA), acrylonitrile butadiene styrene (ABS), polysulfone (PS), polyphenylene sulfide (PPS), polyphenylene oxide (PPO), polyetherimide (PEI), acrylic (PMMA), among others.

The molding system may be capable of molding reinforced plastics with much higher fiber contents or mineral fillers than traditional injection molding machines can process. Generally, it is difficult to mold plastic reinforced with 50% by volume glass fiber or more by the traditional injection molding system 100, due to its reliance on the generation of shear heat that is based on resins that are 70% by volume or more petroleum based compounds. By using static heat generation in the present molding system, the melt may not rely on any petroleum based resin content. For example, the reinforced plastic may contain more than 50% by volume of glass fibers, cellulose fibers, mineral aggregate or carbon fibers.

The present molding system may be less susceptible to shear degradation unlike the traditional injection molding system, due to static heat conduction. The static heat generation may provide accurate temperature control, which may help avoid overheating the material. The extrusion screw may be sized by varying screw length and screw root diameter to control residence times to avoid or reduce thermal degradation.

The present molding injection system may be used for molding temperature and pressure sensitive bio-based resins or plastics which are sensitive to shear degradation. The bio-based resins include cellulose materials, plant starch resins and the sugar based resins, which may be used for products such as medical implants, including, but not limited to, bone screws, bone replacements, stents, among others. The present molding system may also be used for temperature and pressure/shear sensitive metal injection molding (MIM). The MIM feedstocks may be sensitive to temperatures, residence times, and shear pressure, like bio-based resins. The present molding system may mold polymers with up to 80% by volume loading of stainless steel or other metals. The present molding system may be used for injecting food pastes, which may be extruded into molds heated to baking temperatures to form food products of desired shapes. The molding materials may include, but are not limited to, amorphous thermoplastics, crystalline and semi-crystalline thermoplastics, virgin resins, fiber reinforced plastics, recycled thermoplastics, post-industrial recycled resins, post-consumer recycled resins, mixed and comingled thermoplastic resins, organic resins, organic food compounds, carbohydrate based resins, sugar-based compounds, gelatin/propylene glycol compounds, starch based compounds, and metal injection molding (MIM) feedstocks.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention. All of the features disclosed can be used separately or in various combinations with each other.

Those skilled in the art will appreciate that the presently disclosed embodiment teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A molding machine, comprising:
   a first mold half; and
   two or more extruders associated with the first mold half, each extruder of the two or more extruders including a barrel, an extrusion screw inside the barrel, and a nozzle in sealed engagement with the first mold half, wherein each extruder of the two or more extruders is controlled independently to rotate the extrusion screw in a first direction to cause material flow and to rotate the extrusion screw in a second direction opposite the first direction to cease material flow once a targeted pressure is achieved for the respective extruder.

2. The molding machine of claim 1, wherein:
   the first mold half defines a single mold cavity; and
   each extruder of the two or more extruders is in fluid communication with the single mold cavity.

3. The molding machine of claim 1, wherein:
   the first mold half defines two or more mold cavities; and
   each extruder of the two or more extruders is in fluid communication with a different mold cavity of the two or more mold cavities.

4. The molding machine of claim 1, further comprising a single hopper operatively coupled to the two or more extruders to supply material to the two or more extruders.

5. The molding machine of claim 4, further comprising a manifold operatively coupled to the single hopper and the two or more extruders to divert material to respective extruders of the two or more extruders.

6. The molding machine of claim 1, wherein the two or more extruders are arranged in a matrix.

7. The molding machine of claim 1, wherein:
   the two or more extruders are oriented substantially parallel to one another; and
   at least two of the two or more extruders are positioned one above the other along a vertical dimension of the first mold half.

8. The molding machine of claim 1, further comprising a controller monitoring the pressure for each extruder of the two or more extruders and configured to release a clamp force applied to the first mold half to release a part molded therein once each extruder of the two or more extruders achieves its targeted pressure.

9. The molding machine of claim 1, wherein the targeted pressure for each extruder of the two or more extruders is based on the area of the first mold half into which the respective extruder is extruding material.

10. The molding machine of claim 1, wherein the two or more extruders comprise four or more extruders spaced apart from one another.

11. The molding machine of claim 1, wherein the two or more extruders are identical to one another.

12. The molding machine of claim 1, wherein the two or more extruders are different from one another.

13. The molding machine of claim 1, wherein the two or more extruders are operable to extrude the same material or different materials into the first mold half.

14. A molding machine, comprising:
    a first mold half;
    a first extruder associated with the first mold half, the first extruder including a first barrel, a first extrusion screw inside the first barrel, and a first nozzle in sealed engagement with the first mold half; and
    a second extruder associated with the first mold half, the second extruder including a second barrel, a second extrusion screw inside the second barrel, and a second nozzle in sealed engagement with the first mold half, wherein the first and second extruders are controlled independently to rotate the first and second extrusion screws in a first direction to cause material flow and to rotate the first and second extrusion screws in a second direction opposite the first direction to cease material flow through the first and second extruders once first and second pressures are achieved for the first and second extruders, respectively.

15. The molding machine of claim 14, wherein:
    the first mold half defines a single mold cavity; and
    the first and second extruders are in fluid communication with the single mold cavity.

16. The molding machine of claim 14, wherein:
    the first mold half defines a first mold cavity and a second mold cavity;
    the first extruder is in fluid communication with the first mold cavity; and
    the second extruder is in fluid communication with the second mold cavity.

17. The molding machine of claim 14, further comprising a single hopper operatively coupled to the first and second extruders to supply material to the first and second extruders.

18. The molding machine of claim 17, further comprising a manifold operatively coupled to the single hopper, the first extruder, and the second extruder to divert material to the first and second extruders.

19. The molding machine of claim 14, wherein the first and second extruders are oriented substantially parallel to each other and substantially perpendicular to the first mold half.

20. The molding machine of claim 14, further comprising a third extruder and a fourth extruder, and wherein the first, second, third, and fourth extruders are arranged in a matrix.

21. The molding machine of claim 20, wherein the first, second, third, and fourth extruders are uniformly spaced apart from one another.

22. The molding machine of claim 14, further comprising a controller monitoring the pressure of the first and second extruders and configured to release a clamp force applied to the first mold half to release a part molded therein once the first and second pressures are achieved.

23. The molding machine of claim 14, wherein the first and second extruders are identical to each other.

24. The molding machine of claim 14, wherein the first and second extruders are different from each other.

25. The molding machine of claim 14, wherein the first and second extruders are operable to extrude the same material or different materials into the first mold half.

26. A method of molding a part, comprising:
    extruding a first material through a first nozzle of a first extruder in sealed engagement with a first mold half by rotating a first extrusion screw of the first extruder in a first direction;
    extruding a second material through a second nozzle of a second extruder in sealed engagement with the first mold half by rotating a second extrusion screw of the second extruder in the first direction;
    ceasing extrusion of the first material through the first nozzle when a first pressure associated with the first extruder is achieved by rotating the first extrusion screw in a second direction opposite the first direction;
    ceasing extrusion of the second material through the second nozzle when a second pressure associated with the second extruder is achieved by rotating the second extrusion screw in the second direction; and releasing a molded part from the first mold half after both the first and second pressures are achieved.

27. The method of claim 26, wherein extruding the first material and extruding the second material comprises extruding the first and second materials into the same cavity defined by the first mold half.

28. The method of claim 26, wherein extruding the first material and extruding the second material comprises extruding the first and second materials into different cavities defined by the first mold half.

29. The method of claim 26, wherein the first pressure is different than the second pressure.

30. The method of claim 26, wherein the first extruder is identical to the second extruder.

\* \* \* \* \*